United States Patent
Wilt et al.

(10) Patent No.: US 6,208,772 B1
(45) Date of Patent: *Mar. 27, 2001

(54) DATA PROCESSING SYSTEM FOR LOGICALLY ADJACENT DATA SAMPLES SUCH AS IMAGE DATA IN A MACHINE VISION SYSTEM

(75) Inventors: Michael John Wilt, Windham; Michael Philip Greenberg, Goffstown, both of NH (US)

(73) Assignee: Acuity Imaging, LLC, Nashua, NH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/953,772

(22) Filed: Oct. 17, 1997

(51) Int. Cl.$^7$ .................. G06K 9/56; G06K 9/54

(52) U.S. Cl. .................. 382/308; 382/303; 382/304

(58) Field of Search .................. 382/205, 300, 382/307, 308, 303, 304, 305; 345/503; 395/800.22, 800.32, 800.33, 800.34, 800.35, 800.36

(56) References Cited

U.S. PATENT DOCUMENTS

| 4,484,346 | * | 11/1984 | Sternberg et al. | 382/205 |
| 4,541,114 | * | 9/1985 | Rutenbar et al. | 382/205 |
| 4,577,344 | | 3/1986 | Warren et al. | 382/1 |

(List continued on next page.)

FOREIGN PATENT DOCUMENTS

97/34284 * 9/1997 (WO) .

OTHER PUBLICATIONS

Itran Font Verification Tool Itran Corporation, Manchester, NH, Itran Machine Vision Inspection.
Sharp Digital Information Products, Irvine, CA, Sharp Image Processing Series, ©1990.
Sharp Digital Information Products, Irvine, CA, GPB–1 Basic Operation, ©1991.
Sharp, Irvine, CA, Core Image System Design Guide, Apr. 2, 1991.
Datacube, Inc., Peabody, MA, MaxVideo 20, Oct., 1990.
LSI Logic Corporation, Digital Signal Processing (DSP) Databook, Sep. 1991.

(List continued on next page.)

Primary Examiner—Amelia Au
Assistant Examiner—Jingge Wu
(74) Attorney, Agent, or Firm—Bourque & Associates, P.A.

(57) ABSTRACT

A data processing system including a data processor, also called a processing accelerator, processes at least one processor word each clock cycle. Each processor word includes multiple complete data samples which are received individually as part of a sequential stream of logically adjacent or related data samples such as in image data pixels which are part of an image to be processed by a machine vision system. A predetermined number of the data samples are stored together, as a processor word, in dedicated processing accelerator memory. For example, four 8 bit data samples can be stored together as one 32 bit processor word. The system also includes a data aligner which allows the processing accelerator to process at least one processor word comprised of at least one data sample from two processor words. The aligner controls data sample alignment such as for example, pixel alignment in the case of a vision system, to facilitate image data processing. Various processing units are also disclosed including: a neighborhood formation processing unit which, in a vision system, allows the processing accelerator to evaluate and process data within a neighborhood of one or more particular data elements, such as a pixel.

16 Claims, 25 Drawing Sheets

U.S. PATENT DOCUMENTS

| | | | |
|---|---|---|---|
| 4,581,762 | | 4/1986 | Lapidus et al. ......................... 382/22 |
| 4,648,119 | * | 3/1987 | Wingfield et al. .................... 382/205 |
| 4,742,552 | * | 5/1988 | Andrews ............................... 382/308 |
| 4,967,378 | * | 10/1990 | Rupel et al. .......................... 345/510 |
| 4,972,359 | | 11/1990 | Silver et al. ..................... 364/728.05 |
| 5,090,576 | | 2/1992 | Menten ................................. 209/587 |
| 5,115,309 | | 5/1992 | Hang ..................................... 358/133 |
| 5,129,092 | | 7/1992 | Wilson ................................. 395/800 |
| 5,144,683 | * | 9/1992 | Suzuki et al. ......................... 382/205 |
| 5,216,503 | | 6/1993 | Paik et al. ............................ 358/133 |
| 5,268,856 | | 12/1993 | Wilson ................................. 364/748 |
| 5,315,388 | | 5/1994 | Shen et al. ........................... 348/718 |
| 5,319,457 | | 6/1994 | Nakahashi et al. .................. 348/387 |
| 5,526,050 | | 6/1996 | King et al. ........................... 348/387 |
| 5,550,972 | * | 8/1996 | Patrick et al. ....................... 395/164 |
| 5,557,734 | | 9/1996 | Wilson ................................. 395/162 |
| 5,583,954 | | 12/1996 | Garakani ............................... 382/278 |
| 5,602,937 | | 2/1997 | Bedrosian et al. ................... 382/151 |
| 5,657,403 | | 8/1997 | Wolff et al. .......................... 382/302 |
| 5,706,483 | * | 1/1998 | Patrick et al. ....................... 395/525 |
| 5,737,761 | * | 4/1998 | Holland ............................... 711/165 |

OTHER PUBLICATIONS

Sumitomo Metal Industries, Ltd., Hyogo, Japan, Image Processing LSIs and Modules Real Time Image Processing.
Oxford Micro Devices, Inc., Shelton, Cellular Telephone, A236 Parallel Video Digital Signal Processor Chip Hardware Reference Manual, Mar. 12, 1997.
Acuity Imaging, Automatix Correlator Hardware Acceleration for High Speed Correlation Search.
Acuity Imaging, Nashua, NH, I–Pak/V 100, ©1996.
Acuity Imaging, Nashua, NH, I–Pak/ID Pharmaceutical Label Verification System, ©1997.
Acuity Imaging, Nashua, NH, Intelligent Visual Sensor Systems, ©1994.
Acuity Imaging, Nashua, NH, Intelligent Visual Sensors—IVS, ©1996.
Itran Corporation, Manchester, NH, Intelligent Visual Sensors/IVS.
Acuity Imaging, Nashua, NH, Itran, Next Generation I–Pak Package Verification System.
Itran Corporation, Manchester, NH, Itran.

* cited by examiner

PIXEL Y COORDINATE

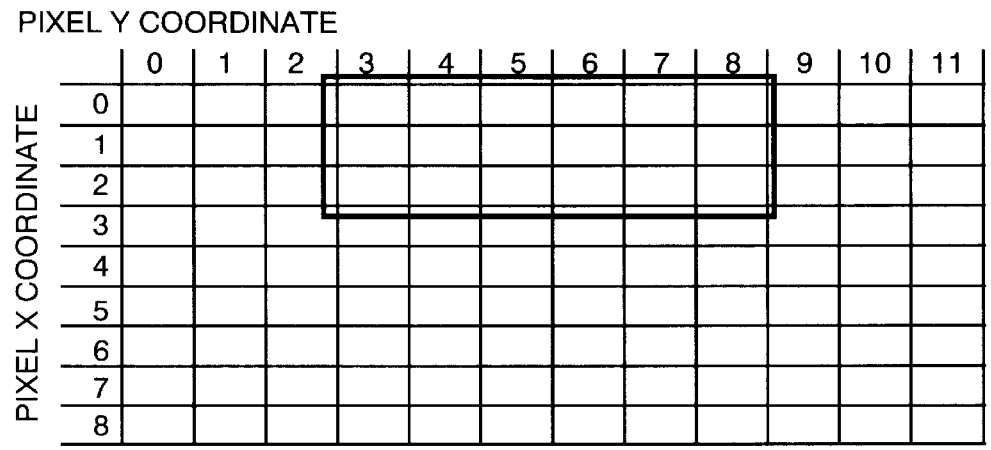

FIG. 14A

|  | LEFT | CENTER | RIGHT |
|---|---|---|---|
| ROW2 | XX/XX/XX/XX | XX/XX/XX/XX | XX/XX/XX/XX |
| ROW1 | XX/XX/XX/XX | XX/XX/XX/XX | XX/XX/XX/XX |
| ROW0 | XX/XX/XX/XX | XX/XX/XX/XX | 00/01/02/03 |

FIG. 14B

|  | LEFT | CENTER | RIGHT |
|---|---|---|---|
| ROW2 | XX/XX/XX/XX | XX/XX/XX/XX | XX/XX/XX/XX |
| ROW1 | XX/XX/XX/XX | XX/XX/XX/XX | XX/XX/XX/XX |
| ROW0 | XX/XX/XX/XX | 00/01/02/03 | 04/05/06/07 |

FIG. 14C

|  | LEFT | CENTER | RIGHT |
|---|---|---|---|
| ROW2 | XX/XX/XX/XX | XX/XX/XX/XX | XX/XX/XX/XX |
| ROW1 | XX/XX/XX/XX | XX/XX/XX/XX | XX/XX/XX/XX |
| ROW0 | 00/01/02/03 | 04/05/06/07 | 08/09/010/011 |

FIG. 14D

|  | LEFT | CENTER | RIGHT |
|---|---|---|---|
| ROW2 | XX/XX/XX/XX | XX/XX/XX/XX | XX/XX/XX/XX |
| ROW1 | XX/XX/XX/XX | XX/XX/XX/XX | 00/01/02/03 |
| ROW0 | XX/XX/XX/XX | XX/XX/XX/XX | 10/11/12/13 |

FIG. 14E

|  | LEFT | CENTER | RIGHT |
|---|---|---|---|
| ROW2 | XX/XX/XX/X | XX/XX/XX/X | XX/XX/XX/X |
| ROW1 | XX/XX/XX/X | 00/01/02/03 | 04/05/06/07 |
| ROW0 | XX/XX/XX/X | 10/11/12/13 | 14/15/16/17 |

FIG. 14F

|  | LEFT | CENTER | RIGHT |
|---|---|---|---|
| ROW2 | XX/XX/XX/X | XX/XX/XX/X | XX/XX/XX/X |
| ROW1 | 00/01/02/03 | 04/05/06/07 | 08/09/010/011 |
| ROW0 | 10/11/12/13 | 14/15/16/17 | 18/19/110/111 |

FIG. 14G

|  | LEFT | CENTER | RIGHT |
|---|---|---|---|
| ROW2 | XX/XX/XX/X | XX/XX/XX/X | 00/01/02/03 |
| ROW1 | XX/XX/XX/X | XX/XX/XX/X | 10/11/12/13 |
| ROW0 | XX/XX/XX/X | XX/XX/XX/X | 20/21/22/23 |

FIG. 14H

|  | LEFT | CENTER | RIGHT |
|---|---|---|---|
| ROW2 | XX/XX/XX/X | 00/01/02/03 | 04/05/06/07 |
| ROW1 | XX/XX/XX/X | 10/11/12/13 | 14/15/16/17 |
| ROW0 | XX/XX/XX/X | 20/21/22/23 | 24/25/26/27 |

FIG. 14I

|  | LEFT | CENTER | RIGHT |
|---|---|---|---|
| ROW2 | 00/01/02/03 | 04/05/06/07 | 08/09/010/011 |
| ROW1 | 10/11/12/13 | 14/15/16/17 | 18/19/110/111 |
| ROW0 | 20/21/22/23 | 24/25/26/27 | 28/29/210/211 |

FIG. 14J

| | | | |
|---|---|---|---|
| 03 04 05 | 04/05/06 | 05/06/07 | 06/07/08 |
| 13 14 15 | 14/15/16 | 15/16/17 | 16/17/18 |
| 23 24 25 | 24/25/26 | 25/26/27 | 26/27/28 |

FIG. 14K

DATA PROCESSING SYSTEM FOR LOGICALLY ADJACENT DATA SAMPLES SUCH AS IMAGE DATA IN A MACHINE VISION SYSTEM

FIELD OF THE INVENTION

This invention relates to data processing systems and more particularly, to a data processing system for processing a stream of data containing logically adjacent or related data samples such as in a machine vision system.

BACKGROUND OF THE INVENTION

There are many data processing applications which require the processing of enormous amounts of data. In many of these applications, the data to be processed is received as a sequential stream of logically adjacent data samples. One example of this type of data is machine vision data.

Machine vision is a specific type of industrial automation technology which extracts data from video images and makes this information available for process control and/or quality control.

Much of the underlying technology used for machine vision is shared with other fields. CCD video camera technology is used in camcorders and surveillance cameras. Digital image capture hardware is used for desktop publishing and multimedia applications. Image analysis software such as the public-domain software application program "Image" available from the National Institute of Health (NIH) in Bethesda, Md., is used for scientific image analysis. Image analysis algorithms have received extensive attention in academic research. Many companies, including the assignee of this invention, have built machine vision systems by combining these inexpensive and readily available components.

Machine vision technology is utilized in a number of applications. There are four (4) major machine vision applications namely: 1) inspection applications; 2) dimensional measurement; 3) object location (for guidance or parts placement); and 4) part identification. These applications are useful in, for example, industrial assembly (robotics) applications and product inspections. For example, machine vision may be utilized to determine the position of a base part relative to a reference point.

Similarly, other machine vision applications include determining whether or not product packaging is intact, whether integrated circuit component leads are in their proper location and properly shaped, product logo or label registration and correctness, and finished product inspection itself.

A vision system camera gathers a significant amount of information which must be accurately and rapidly processed in order to render a decision regarding the inspection performed. Machine vision data is generally presented as a sequential stream of logically adjacent and related data samples. Such volume and type of data presents a significant hurdle to rapid processing given the sheer volume of information and the relatedness of the data samples.

Software implementations and most hardware implementations of prior art machine vision data processing techniques involve processing one pixel of machine vision data (one data sample) at a time. Fixed length digital codes representing unsigned integers (or bytes or binary vectors) which are packed into words in a computer system's memory typically represent machine vision image pixels. In many prior art systems, 1 to 4 pixels of data (one data sample) is packed into each memory word but these pixels (data samples) are processed one at a time by a program running on the computer. Present image processing systems also benefit from the computer's memory cache that is, the computer typically fetches entire cache lines into its fast internal cache memory, thereby minimizing the time spent accessing external memory. Once a cache line of image data is located in the computer's internal cache memory, the computer may quickly access the individual pixels for processing.

The primary advantage of these prior art systems is that they are very flexible and may be easily adapted to different applications. The primary disadvantage, however, is that these computer systems perform operations sequentially so that the overall speed of the system is directly proportional to the speed of the computer. For many present machine-vision applications, the general-purpose computers available today can not run fast enough to meet the application requirements.

Accordingly, one of the primary challenges presented by machine vision is integrating adequate computation hardware. General-purpose CPU's and image processing hardware designed for other applications cannot meet the price/performance ratio required for many machine vision applications.

A number of devices have been developed to accelerate computations on digital image data. These specially-designed processors perform specific computations on an image data stream much faster than a general-purpose CPU of a similar size and cost. One example of such devices is a pipeline processor. Previous image pipeline processing architectures process image pixels in raster order at high speed, receiving and, for many operations, generating one new pixel each clock pulse. These devices are often used in applications where they are connected directly into the stream of video data generated by the camera.

These pixel-pipeline processors can be useful for machine vision, but they are not optimal for many machine vision applications. For a machine vision system, the required speed is a function of the application, not the video data rate. Many machine vision applications require data rates that are substantially faster or slower than the data rate of a standard video camera or other source of image data, either analog or digital. Other issues limiting the usefulness of pixel-pipeline processors for machine vision are a long processing latency and the fact that such pixel-pipeline processors often require substantial re-configuration effort to switch processing operations.

Several devices have been invented specifically to perform machine vision computations in a cost-effective manner. Some systems use a vision coprocessor which operates directly on the image data stored in the memory banks controlled by the primary CPU, much the same way an Intel 8087 or a Motorola MC68881 performs floating-point computations on data stored in the memory banks of the Intel 8088 or the Motorola 68000 respectively. These systems achieve a cost advantage by sharing a single memory controller between the CPU and the coprocessor, but pay a performance penalty because the CPU is intimately and extensively involved in controlling the coprocessor.

Another existing machine-vision system architecture uses a large number of simple vision processors which operate on individual pixels or multiple rows or columns of image data in parallel. The number of processors may be expanded to build a very fast system, but the parallel memory and interconnection circuitry is relatively complex and expensive.

Another existing machine-vision system architecture uses digital signal processing devices (DSP's). These devices may be programmed to perform operations required for machine vision, but they are better at one-dimensional signal processing required for audio or modem applications. Another disadvantage of DSP based systems, both in vision and non-vision applications, is that although they may be programmed to perform many different operations, careful assembly code optimization and detailed knowledge of the DSP instructions are required to achieve optimal performance. In addition, the DSP engines typically require expensive, high-speed memory, resulting in an expensive data or vision processing system.

Another technique used in existing machine-vision system architectures is to use look-up tables indexed by pixel values or simple functions of pixel values to implement normalized correlation and other computations required for machine vision. The advantages of using look-up tables are that they may be reprogrammed to implement different operations, they may perform non-linear operations, and they may be implemented using readily available memory components. The disadvantages of look-up table implementations of computations include the performance impact of re-loading one or more look-up tables to change operations and the limited range of computations that may be performed in this fashion.

SUMMARY OF THE INVENTION

Accordingly, one object of the present invention is to facilitate exceptional price/performance for machine vision and other processing systems while addressing many of the limitations of the current technology. The invention provides an innovative architecture which, in one embodiment, exploits newly available digital memory and in the preferred embodiment, ASIC (Application Specific Integrated Circuit) technology. In addition, the present invention provides a novel implementation of existing image processing techniques. While the present invention will be explained with regard to an image processing system or processing accelerator component of a vision system, this is not a limitation of the present invention as many data processing applications can take advantage of the disclosed invention such as audio signal processing, digital signal processing, or any other application where a 1, 2 or more dimensional data set is to be processed. Additionally, image data samples from other sources such as a scanning microscope, or other related or adjacent data samples such as seismic survey data, etc., can be processed by the system of the present invention.

The invention achieves substantial performance benefit by grouping and storing multiple data samples (multiple pixel data) received from a stream of related or adjacent data samples, in one memory or processor word, and by processing all of the data samples stored in a processor word simultaneously. This architecture may be used to implement binary and gray-scale morphology, normalized correlation, image arithmetic, linear and non-linear convolutions, histogramming, projection, segmentation, and many other algorithms which are well known in the art[1] and incorporated herein by reference. This invention uses straight forward digital circuit implementations of these computations replicated for each pixel and combined with additional logic to process all of the pixels stored in a word of image data simultaneously.

[1] Haralick, Robert M. and Shapiro, Linda G. "Computer and Robot Vision, Volume II", Addison-Wesley, 1993. Gonzalez, Rafael C. and Woods, Richard E., "Digital Image Processing", Addison-Wesley, 1992. Ballard, Dana H. and Brown, Christopher M., "Computer vision", Prentice-Hall, 1982

Pixels or other data samples received from a data stream of logically related data samples are packed into wider words for storage and transmission before and after processing. For example (but not a limitation of the present invention), four 8-bit pixels are packed into a 32 bit wide memory word, transmitted over 32 bit memory busses, etc. The number of pixels being input (and possibly output) each memory clock cycle corresponds to this natural memory/bus organization. Since pixel processing operations must be capable of starting and ending on any image pixel boundary, the present system and method re-aligns and signals the validity of pixels throughout each processing operation.

For maximum performance, pipelined burst-mode SDRAM (Synchronous Dynamic Random-Access Memory) memories are used. The present invention makes use of coordinated FIFO (First In First Out) buffers to provide image processing units with an uninterrupted stream of data so that processing may proceed at the full clock rate. The addition of a buffer and a number of data path switches allows multiple memory sharing and flexibly locating source and destination operand arrays.

The present invention incorporates an internal sequencing engine, permitting the data processor (processing accelerator) of the invention to run arbitrary sequences of operations without requiring intervention from an external CPU. This sequencing engine reads simple instructions and saves results in the dedicated processor memory bank(s).

The present invention also allows for snooping or "capturing" of the image or other data to be processed into the dedicated processor memory as it is transferred over a burst-mode peripheral bus to another memory. This feature permits the invention to receive data in the dedicated memories while the system simultaneously transmits the data to the CPU memory for additional processing or to the display memory for viewing.

Although the multiple pixel per clock technique can be extended to any number of pixels per word, four pixels per bus or processor word, one bus or processor word per memory word, are utilized in the preferred embodiment and illustrated, for exemplary purposes, in the descriptions below.

BRIEF DESCRIPTION OF DRAWINGS

FIGS. 14A–14K are schematic illustrations of the operation of a word-wide neighborhood formation image processing unit in accordance with yet another aspect of the present invention;

DESCRIPTION OF THE PREFERRED EMBODIMENT

Figure 1:
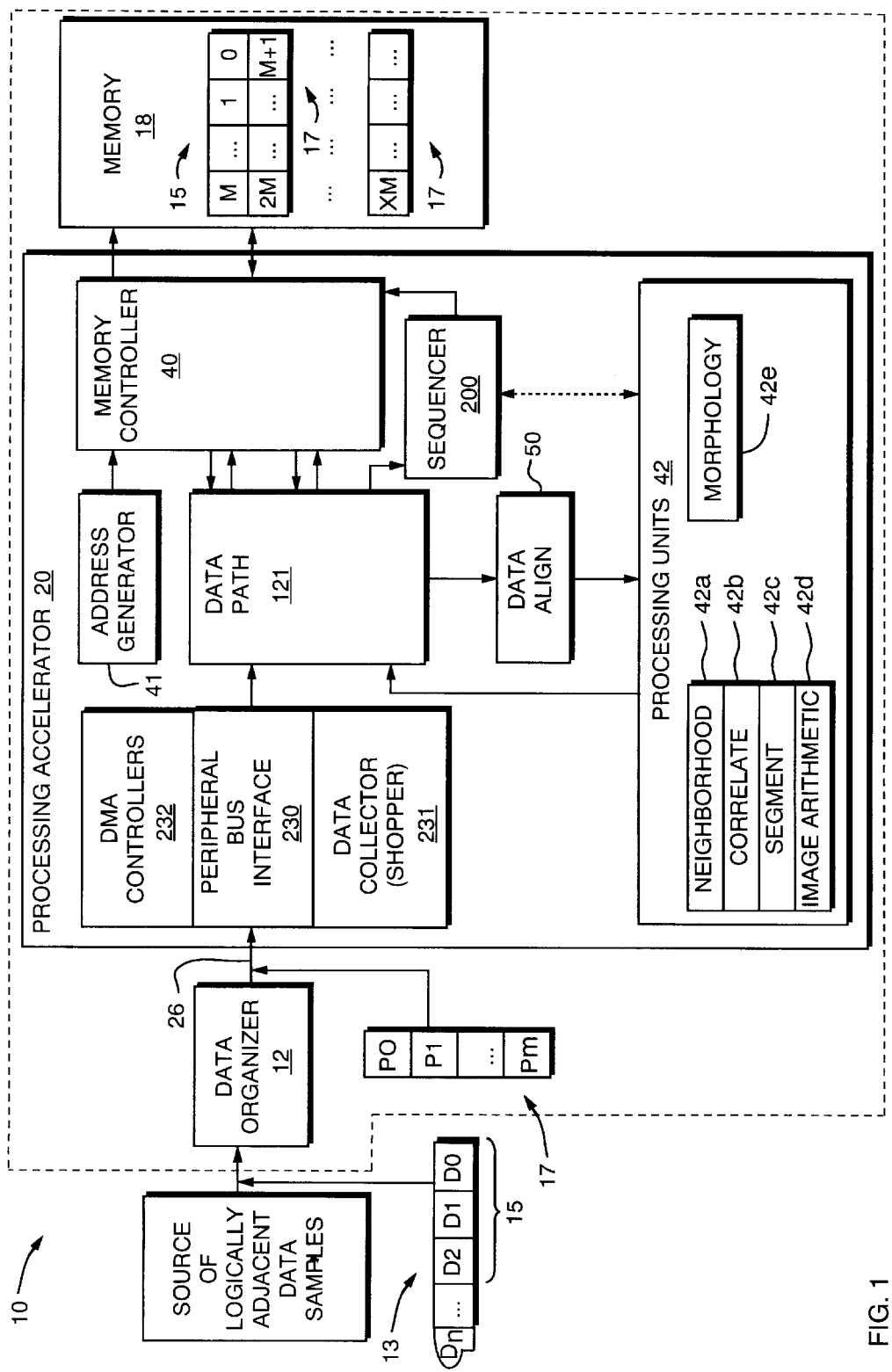
FIG. 1 is a schematic block diagram of a data processor and processing accelerator according to one feature of the present invention.

The present invention features a novel data processor 20, FIG. 1, (herein also referred to as a processing accelerator), for use in a data processing system 10. The present invention contemplates that the invention disclosed herein can be implemented by, within and with numerous types of data processing systems including, but not limited to, vision processing systems.

The data processor 20 of the present invention is well suited for receiving a generally continuous stream 13 of logically related or adjacent data samples 15, as would be the case wherein the individual data samples 15 are individual pixel data values from an image to be processed, which image(s) are captured by a camera. The data samples 15 may be analog or digital value data samples. As is well known in the art, the individual data samples 15 are themselves typically comprised of data elements such as bits in a byte.

The stream of logically related or adjacent data 13 is received by a data organizer 12, such as a digitizer or a frame grabber in a vision system. The data organizer 12 receives the individual data samples 13 and groups a predetermined number of the data samples 13 into processor words P0–Pm, 17 for transmission over data bus 26 to the data memory 18 via the peripheral bus interface 230, data path 121 and the memory controller 40. The processor words 17 each contain two (2) or more data samples 15. In the preferred embodiment, the data samples 15 are 8 bits in length and four (4) logically adjacent or related such data samples 15 are grouped by the data organizer 12 into one processor word 17. As will be explained further below, a memory word can contain more that one processor word 17.

The data processor 20 controls the storing of the processor words 17 into at least one memory 18 which forms part of a larger memory subsystem, as will be described below. Each processor word 17 comprising two or more data samples 15 is stored under control of the data processor 20 which includes, in the preferred embodiment, at least one memory controller 40 and one or more address generators 41. Additional features of the present invention, which will be explained in greater detail below, include a processing sequencer 200, which allows the data processor 20 to operate generally independently and autonomously from a host CPU; a data aligner 50 which realigns data samples 15 within a processor word 17 whenever data samples to be processed "cross over" the boundary between two (2) processor words 17 or when an array of data to be processed does not start or end at a processor word boundary; and one or more processing units 42 such as neighborhood 42a, correlation 42b, segmentation 42c, image arithmetic 42d morphology 42e processing units which each perform a specialized task, as will be explained below.

Figure 2:
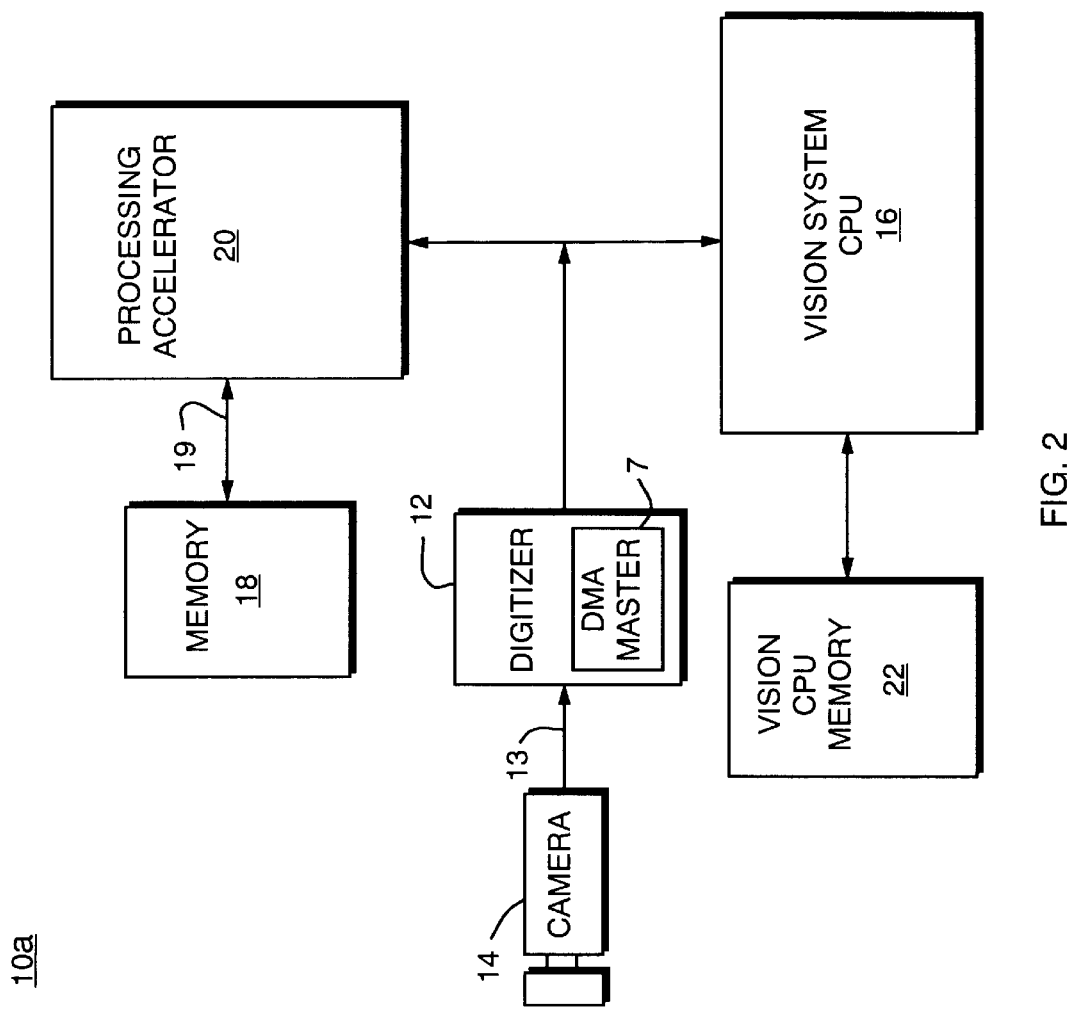
FIG. 2 is a schematic block diagram of a machine vision system incorporating the present invention in the form of a vision processing accelerator.

A typical machine vision system 10a, FIG. 2, on which the data processor 20 of the present invention is utilized as a processing accelerator, is described herein for exemplary purposes. The vision system 10 includes a digitizer 12 (frame grabber) as the data organizer, which receives the stream 13 of logically adjacent or related data samples, such as image data, from camera 14. The digitizer 12 may store image data 13 locally or preferably, for optimum performance and lowest cost, place the captured and grouped data samples 15 (image data) in a dedicated image or data sample memory 18 using an embedded direct memory access (DMA) controller 7. A data or vision data processing accelerator 20 (the subject of the present invention), is also provided. In the current invention, the processing accelerator 20 is coupled to the data sample memory 18 by memory bus 19, for storing and manipulating data samples 15 stored as processor words 17 independent of a vision system CPU 16 and a vision CPU memory 22.

Figure 3:
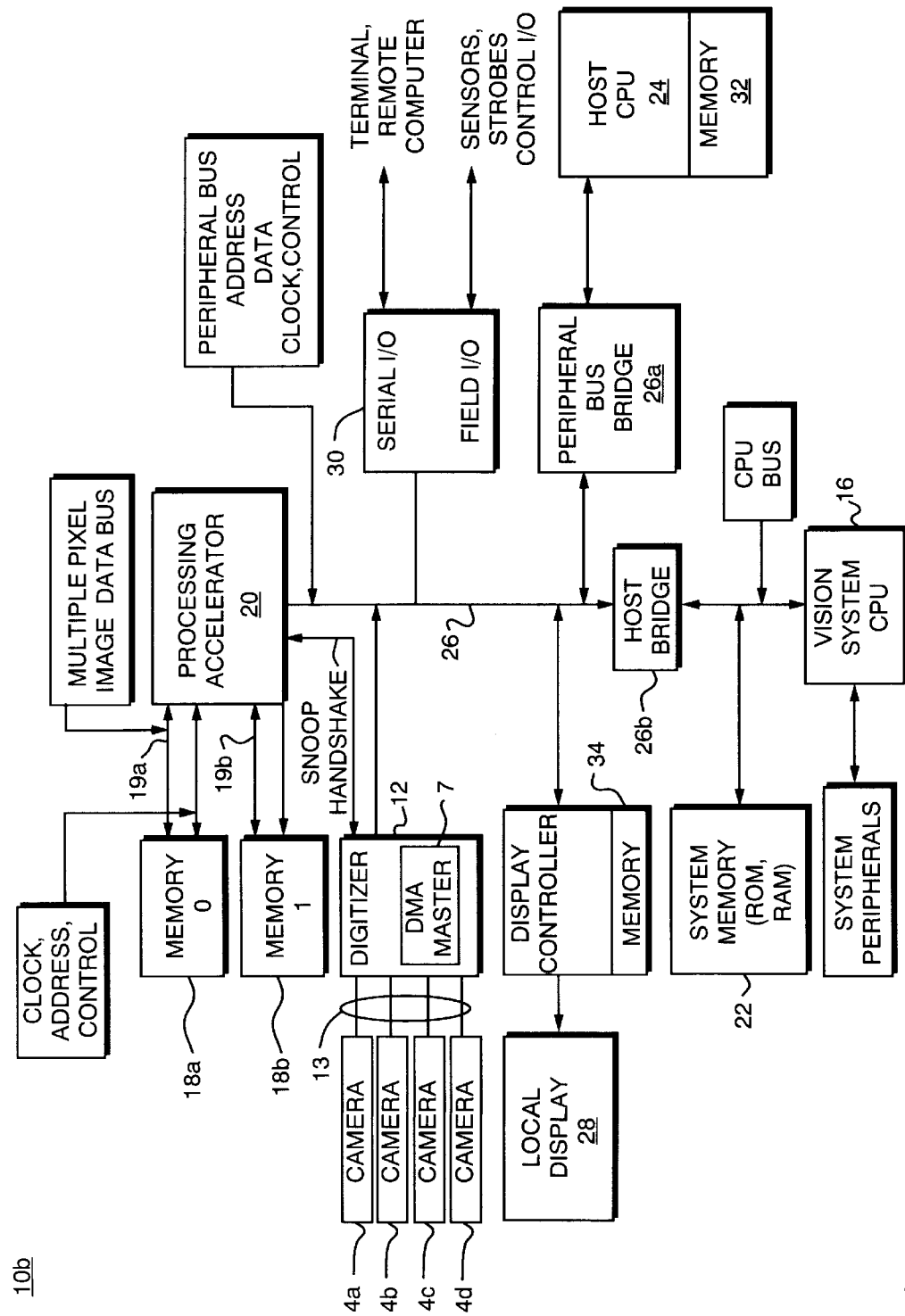
FIG. 3 is a more detailed schematic block diagram of a machine vision system incorporating the present invention in the form of a processing accelerator.

In one embodiment of such a vision system 10b FIG. 3, captured images (streams of image data samples 13) from multiple cameras 14a–14d can be processed by the vision accelerator 20, the embedded vision system CPU 16, or by a host CPU 24 in cases where the vision system is resident on the host CPU peripheral data bus (e.g. as an adapter or peripheral card). The vision system 10b often includes a local display 28, and serial and discrete input/output ports 30 to support real-time machine vision operations and intercommunication with other devices.

For maximum efficiency, the digitizer 12 in this implementation, packs multiple pixels (data samples 15) (e.g. four 8 bit pixels are packed into a 32 bit word) into a larger word (processor word 17) to match at least the memory data bus 19 width and in the preferred embodiment, the peripheral bus 26 width. If the memory data bus 18 width and the peripheral data bus 26 width are not the same, the processing accelerator 20 would reformat the processor word 17 width to match the width of the memory data bus 18 or the peripheral data bus 26. The bus interface unit 230 would perform additional packing of bus or processor words 17 into wider memory words when required.

The digitizer 12 in connection with DMA Master 7 moves pixel data samples in high speed bursts into a portion of peripheral data bus address space. In the present invention, this may be one of the image memories 18a and/or 18b, shared vision system CPU memory 22, host CPU memory 32, or display controller memory 34.

Once a sufficient number of image data samples (typically a full image) are stored in image memory 18, processing accelerator 20 operations can commence. The result of any such operation may be another image (result array) or a set of data in registers. Data organizer 12, DMA Master 7, and DMA controllers 232 (FIG. 1) in the vision accelerator 20 are provided to efficiently format incoming image data and to move processed images and image data samples 15 stored in register data sets as processor words 17 out of the processing accelerator 20 into host or vision CPU using bus 26 and host bridge 26b; to display controller memory 34 for local display 28; as well as to any device coupled over the peripheral data bus bridge 26a.

Figure 4:
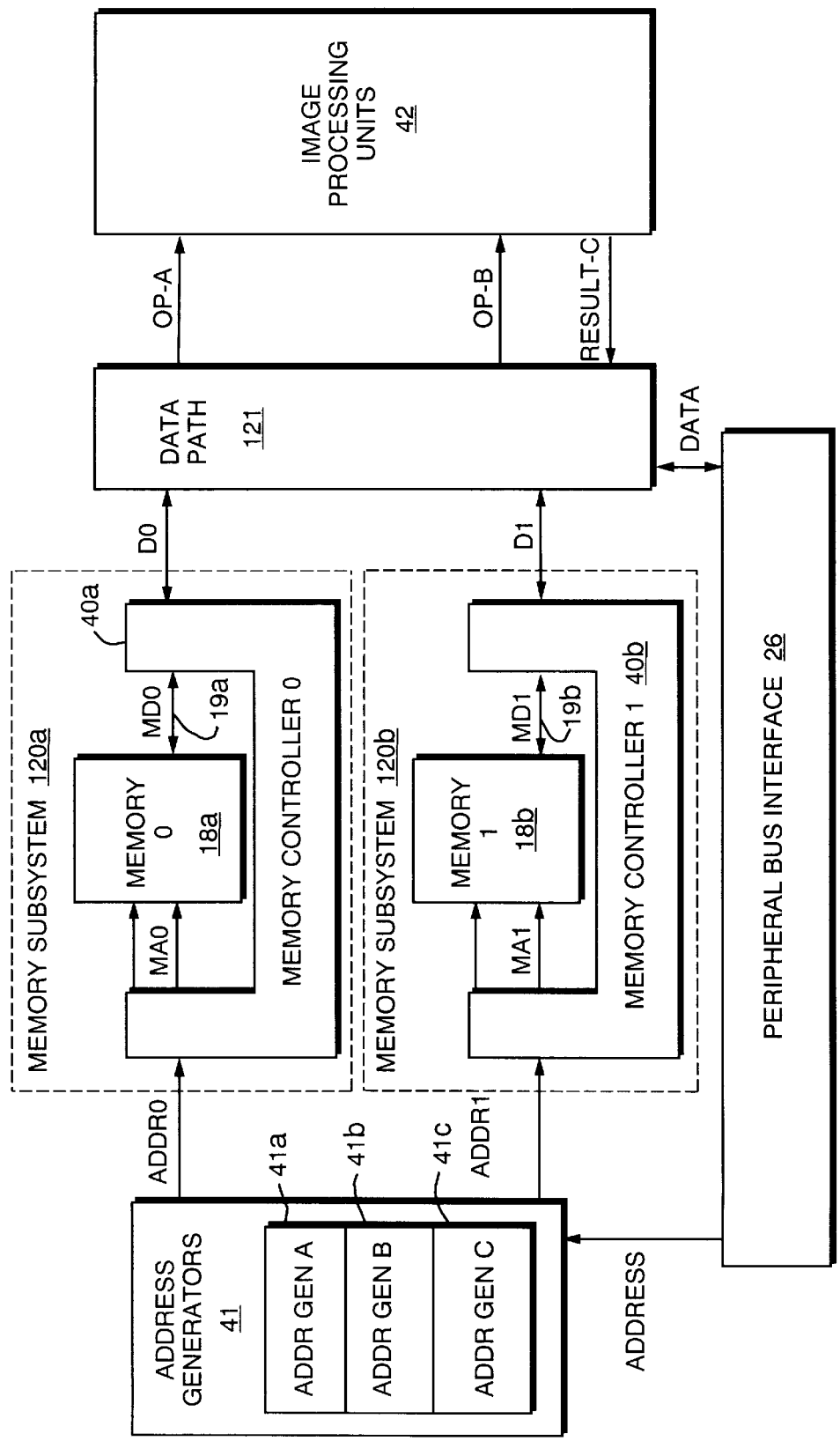
FIG. 4 is a schematic block diagram of a portion of the processing accelerator of the present invention illustrating the memory sub-system utilized by the present processing accelerator.

The memory subsystem 120, FIG. 4, of the processing accelerator 20 of the present invention features one or more dedicated high-speed memory controllers 40. The memory controllers 40 are completely responsible for the operation of their respective memory banks 18a, 18b, generating, in combination with address generators A, B and C 41a–41c, all the required address and control signals to read or write complete processor words 17 of image or other data samples 15 at sustained rates of one processor word 17 per clock pulse, per memory controller 120.

The processing accelerator 20 described herein is implemented on an integrated circuit, as an ASIC, although this is not a limitation of the present invention. The preferred embodiment of the present invention contemplates that the memory 18 is implemented as burst mode synchronous memory such as SDRAM, SGRAM, RAMBUS or other such memory devices, commonly available presently or in the future in the industry.

Figure 5A:
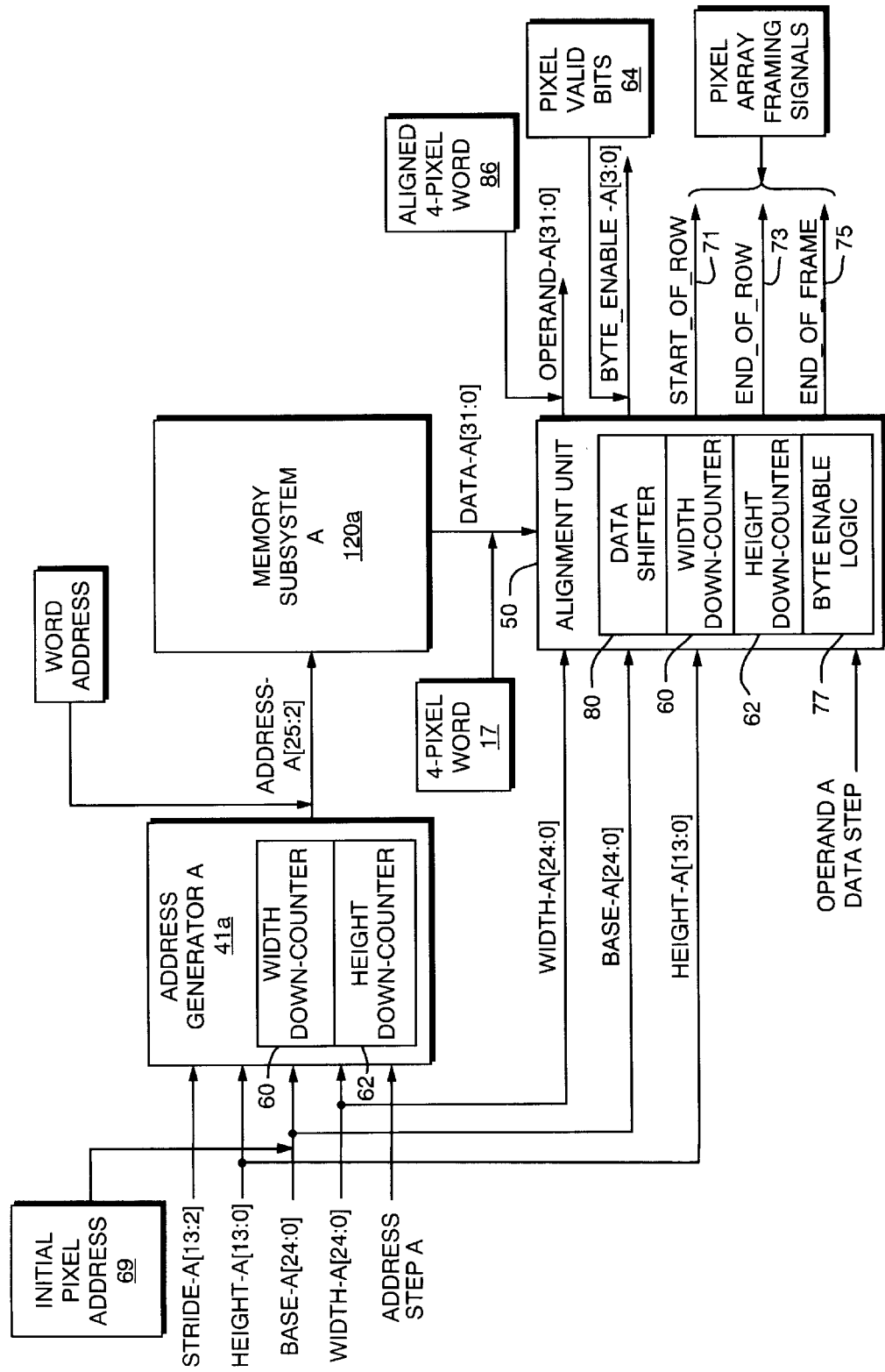
FIG. 5 is a schematic block diagram illustrating a simplified diagram of a pixel alignment unit in accordance with one aspect of the present invention.
Figure 5B:
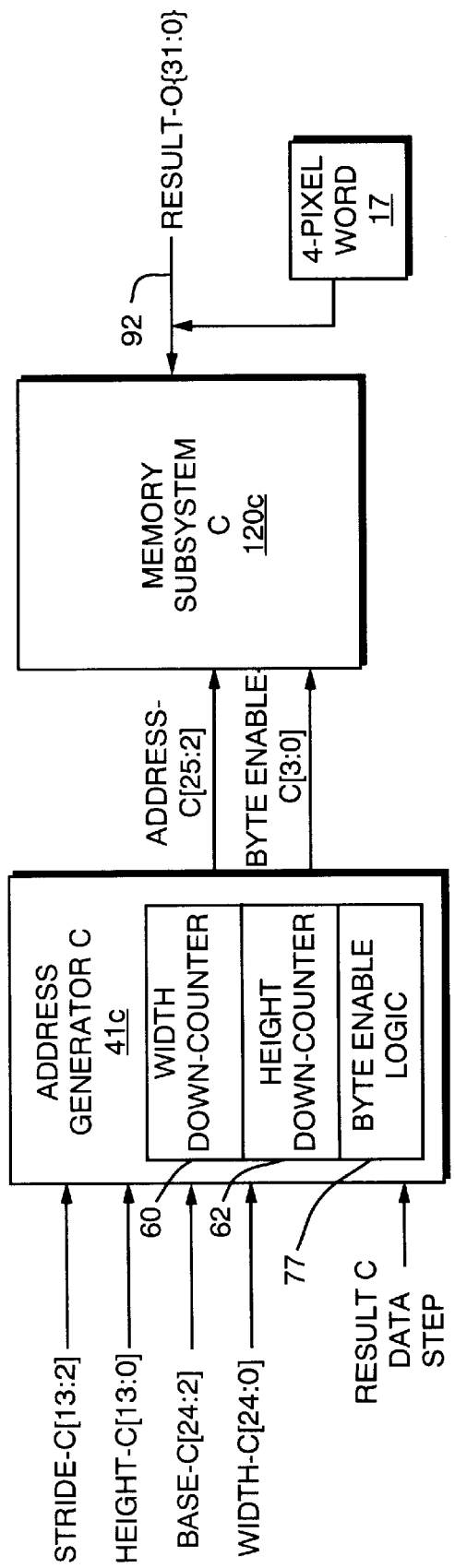

One feature of the present invention is the providing of a data alignment unit 50, FIG. 5, which, together with Address Generator A 41a and Address Generator C 41c, solves the problem of allowing the processing accelerator 20 to process full processor words 17 of data when only selected data samples 15 of data (certain pixels in a memory word) less than the full processor word 17, are to be processed.

Figure 6A:
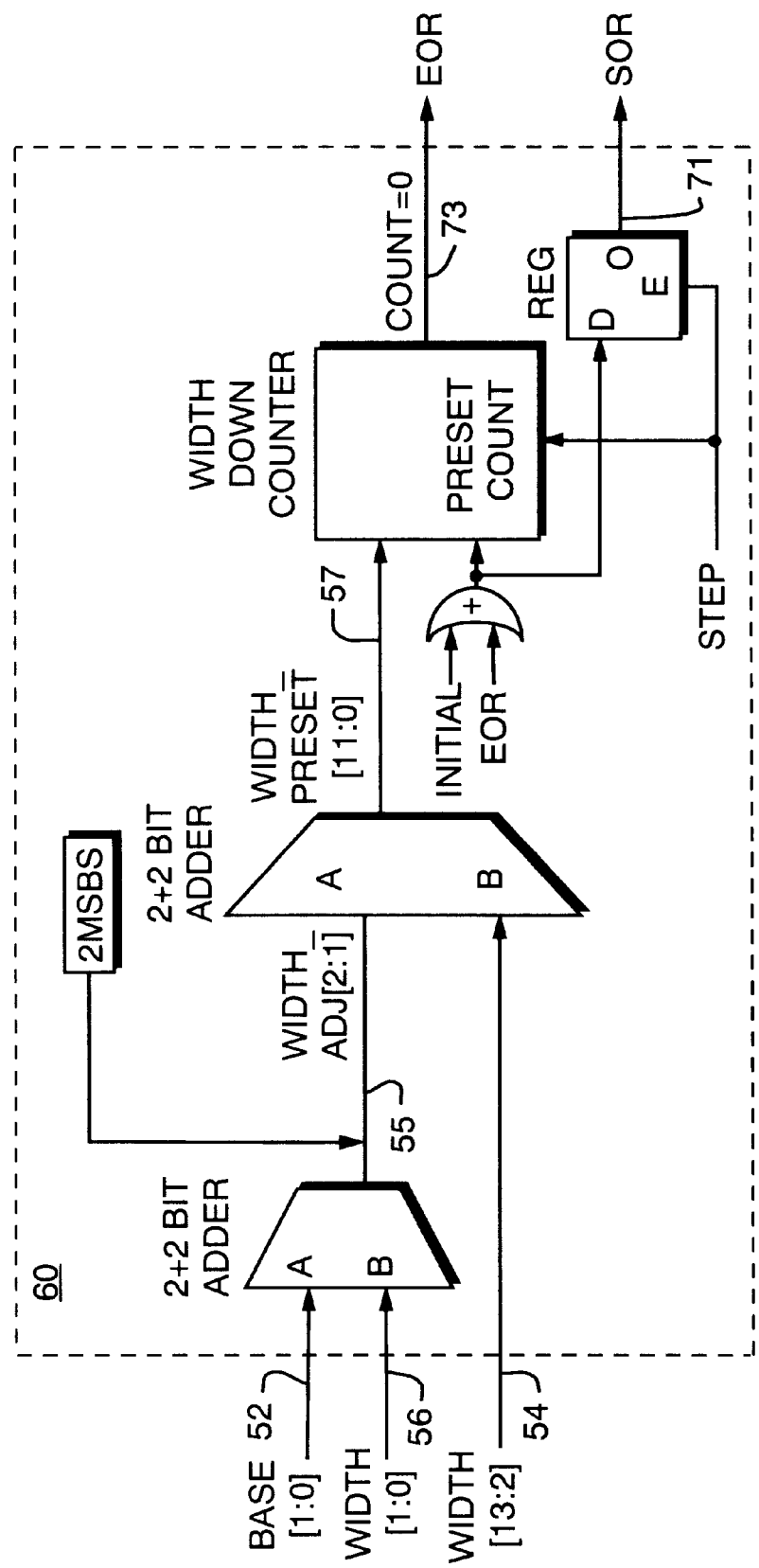
FIGS. 6A–6D are schematic block diagrams illustrating counters and the pixel alignment data shifter used to implement the functionality of the alignment unit in accordance with one aspect of the present invention.
Figure 6B:
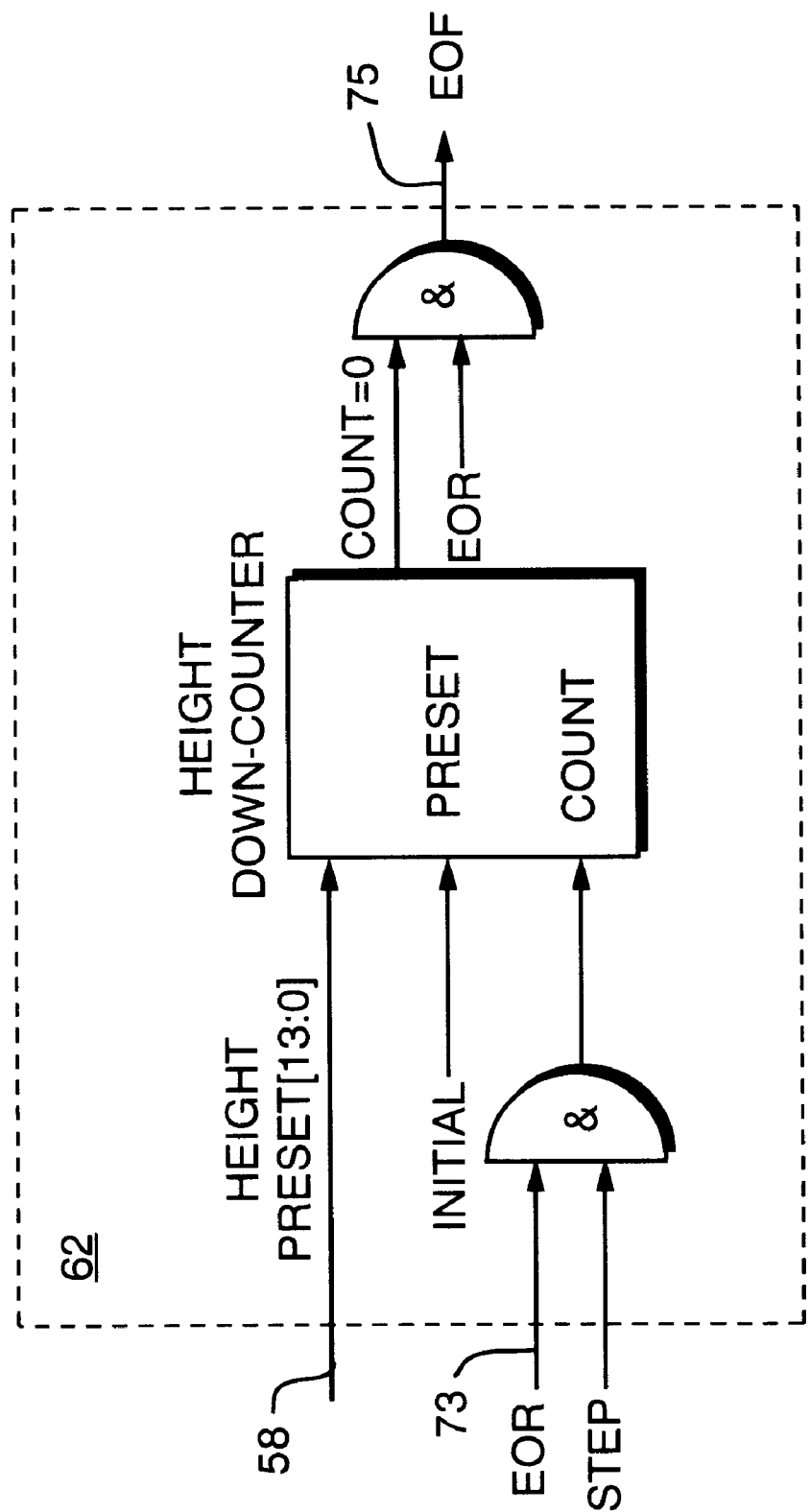
Figure 6C:
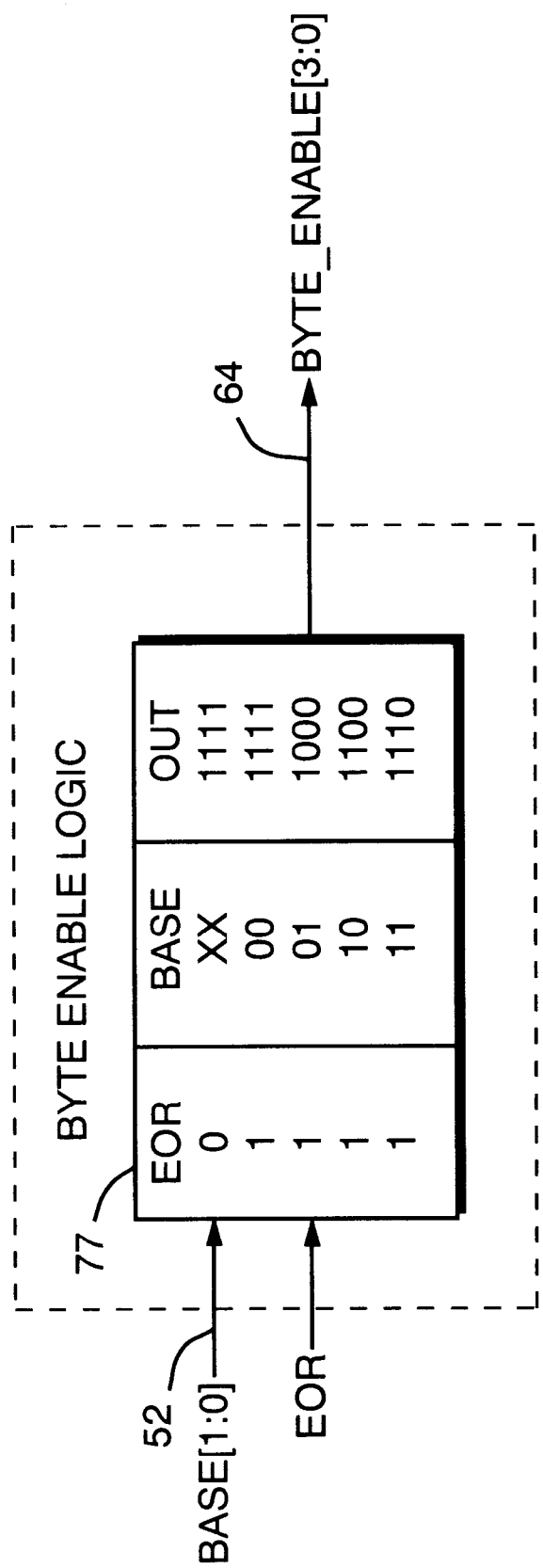
Figure 6D:
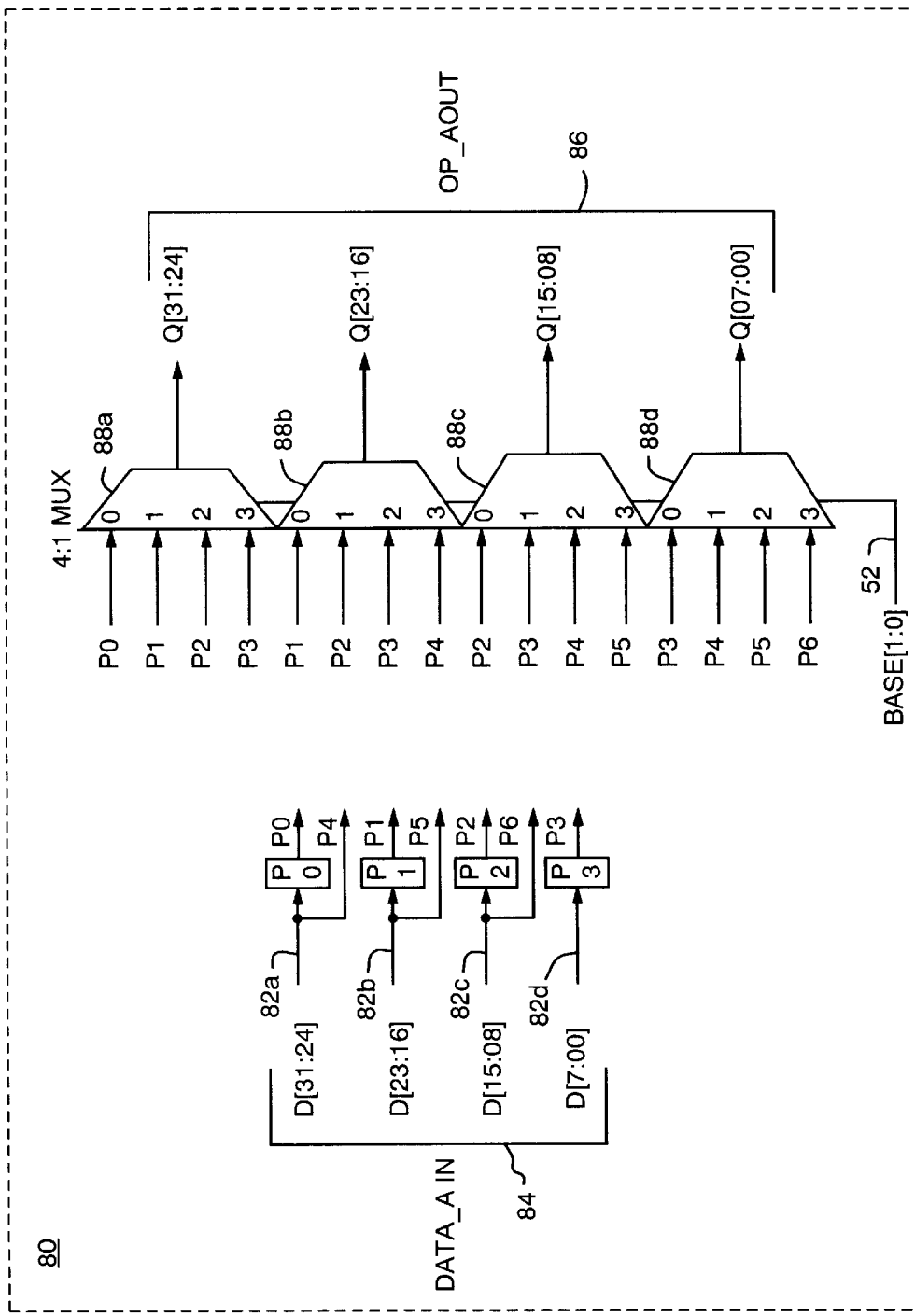

Exemplary aligner circuitry is illustrated in FIGS. 5 and 6A–6D. FIGS. 6A–6C illustrate the counting circuitry in Address Generator A 41a, alignment unit 50 and Address Generator C 41c, which generate the required width counter preset and the array framing (sor, eor, and eof) and byte valid (byte_enable) signals. FIG. 6D illustrates one embodiment of the actual data alignment circuit. The processing accelerator 20 scans pixels (processor words 17 each containing multiple data samples 15) in raster order (left to right, top to bottom). The user specifies a starting address (base) 52 and the number of pixels (data samples) per row (width) 54 to the nearest pixel.

In the present example of the invention, the processing accelerator 20 processes four pixels per memory word, therefore from the user-supplied base value bits [24:0] 69, bits [24:2] specify a memory word address 67 while bits [1:0] specify the pixel offset 52 from a memory word boundary. Similarly, width bits [1:0] 56 specify how many additional pixels (data samples) are to be processed once the number of memory (processor) words specified by width bits [13:2] 54 have been presented on the Operand-A bus 86 by the alignment unit 50. The height parameter 58 determines how many "rows" of data samples will be fetched.

The alignment unit 50 and Address Generators A and C 41a and 41c, FIG. 5, consider both the width and the least significant bits of the base address and determines the total number of words to be fetched from memory in each row. The alignment unit 50 and address generators A and C 41a and 41c contain width 60 and height 62 counters, permitting them to generate the start of row 71, end of row 73, and end of frame 75 signals used by processing units 42 (FIG. 4), to determine which individual pixels or pixel arrays are valid on each clock pulse. The byte enable outputs 64 of the alignment unit signal which pixels at the end of a row are valid.

FIGS. 6A–6C illustrate the counting and byte enable functions of the address generators 41a and 41c and the alignment unit 50. The number of multiple-pixel words which must be fetched from memory is computed as shown: The lsb's of the base 52 and width 54 settings (2 in this example), corresponding to 4 (four) pixels per word) are added together and the two msb's 55 of the three bit result (again corresponding to four pixels per word) are added to the remaining msb's 54 of the width setting (12 bits in the present example). The resulting value 57 determines the preset value for the width down-counters 60 in Address Generator A 41a and the alignment unit 50. This counter 60 cycles from this preset value down to zero for each row of the source image.

During the first state (immediately after initializing the counter and following the end of each row), the start of row (sor) signal 71 is asserted and the height down counter 62 is decremented. Each time the width down counter 60 reaches zero, the end of row (eor) signal 73 is asserted. The height down counter 62 is initialized to the height preset setting once before the operation is started. When the height down counter 62 reaches zero, the end of frame (eof) signal 75 is asserted on the last width down-counter 60 (eor) 73 count.

The byte enable logic 77 in the alignment unit 50 asserts all four byte enables 64 except during the eor state. During eor state, the byte enable signal pattern 64 is determined by the two lsb's of the base address 52 setting as shown. The byte enable logic 77 can be extended to other bus widths as follows: when the width setting is an exact multiple of memory words (width lsb's=0), all byte enables are asserted. For all other cases, the byte enable pattern consists of (number of pixel data samples) one's shifted to the right by the lsb value with zero's filled to the right.

Note that the above discussion assumes "big-endian" pixel ordering that is, multiple pixels stored in memory from left to right. The technique is easily extended to "little-endian" pixel or data sample ordering and other data sample/pixel widths where an individual pixel datum does not cross a memory word boundary.

Figure 7:
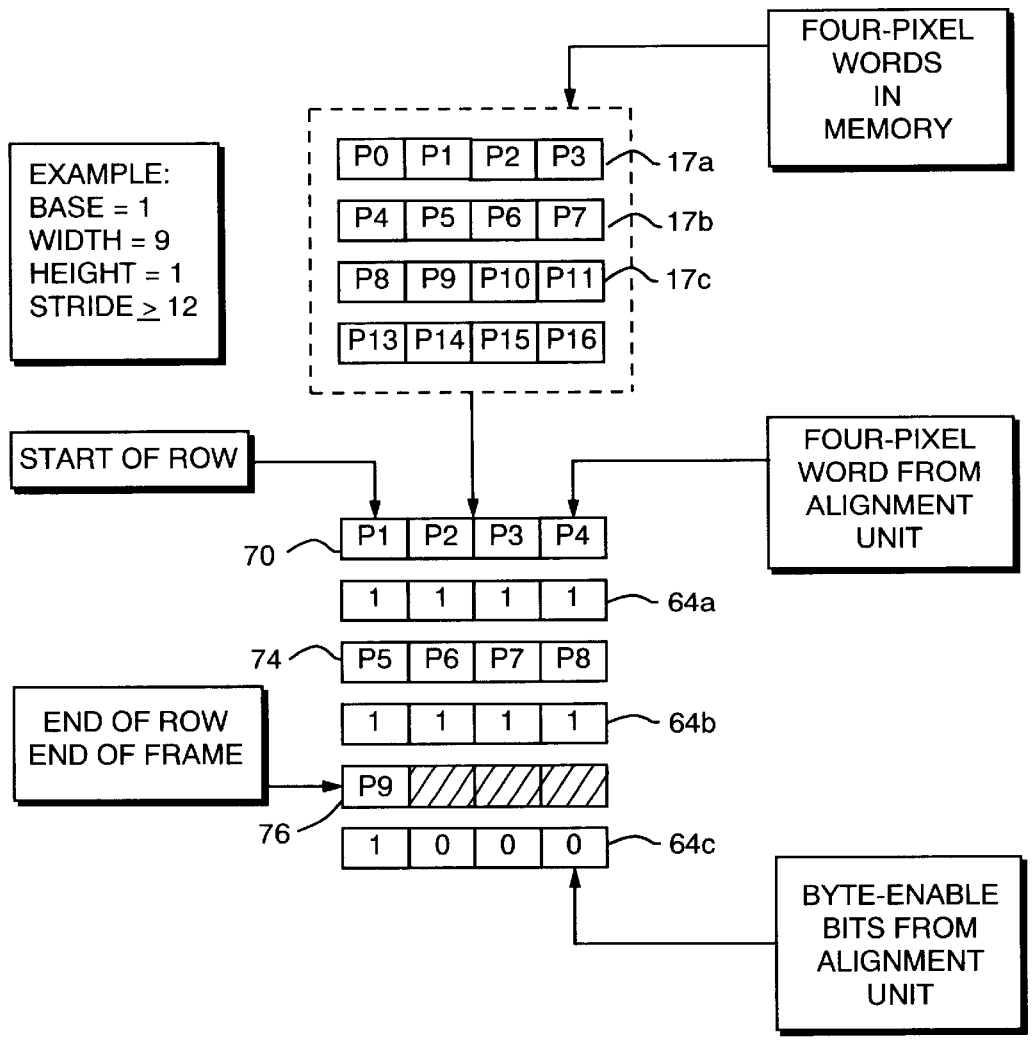
FIG. 7 is a schematic illustration showing the operation of the alignment unit in accordance with one aspect of the present invention.

FIG. 7 is an example of processing nine (9) pixels (data samples) four (4) pixels per row, with a base offset of one (1) pixel (beginning with pixel (data sample) labeled P1). For the example in FIG. 7, the sequence of events is as follows:

1. On the first memory clock cycle, the first memory/processor word 17a containing pixels (data samples) labeled P0 through P3 is read from memory 18 and stored in the alignment unit 50.

2. On the second memory clock cycle, the second memory/processor word 17b containing pixels (data samples) labeled P4 through P7 is read from memory 18 and the alignment unit 50 outputs aligned processor word 70 containing the four (4) pixel data samples labeled P1 through P4, and asserts byte_enable signal 64a comprising bits [3:0] and start of row (sor) signal 71, (FIG. 6).

3. On the third clock, processor word 17c containing pixel data samples labeled P8 through P11 are read from memory, after which the alignment unit 50 outputs aligned processor word 74 containing the four pixel data samples labeled P5 through P8 and asserts byte_enable signal 64b comprising bits [3:0] which together form a four bit byte enable signal 64 with its associated meaning as shown in FIG. 6.

4. On the fourth clock, the alignment unit 50 outputs processor word 76 containing pixel data sample labeled P9, and asserts byte_enable signal 64c comprising bits [3:0], end of row (eor) signal 73 and end of frame (eof) signal 75.

It should be noted that two word fetches are required before the first valid output is presented.

FIG. 6D is an example of one implementation of a data shifter portion 80 of the alignment unit 50 for a four-pixel wide memory bus with 8 bit pixels. Four (4) registers 82a–82d hold the values of the previous four valid pixel data samples (labeled P0 through P3 for exemplary purposes) from the 32 bit Data A Input bus 84. The present value, when valid, represents the next four pixels (P4 ... P7). The 2 lsb's [0:1] 52 of the base address setting determine how the pixels must be realigned for presentation on the Operand A output bus 86. The two base least significant bits 52 select the appropriate port on each multiplexer 88a–88d. To provide at OP_A Out bus 86 a re-aligned processor word.

Pipelined burst-mode memories 18 or similar memory devices are preferably used in order to achieve maximum data bandwidth. Examples of these are synchronous dynamic/graphics random-access memory (SDRAM/SGRAM) and RAMBUS DRAM (RDRAM). These devices accept an address and read command and output the corresponding data at a later time. In general, new commands are allowed to overlap operations currently in progress.

Figure 8:
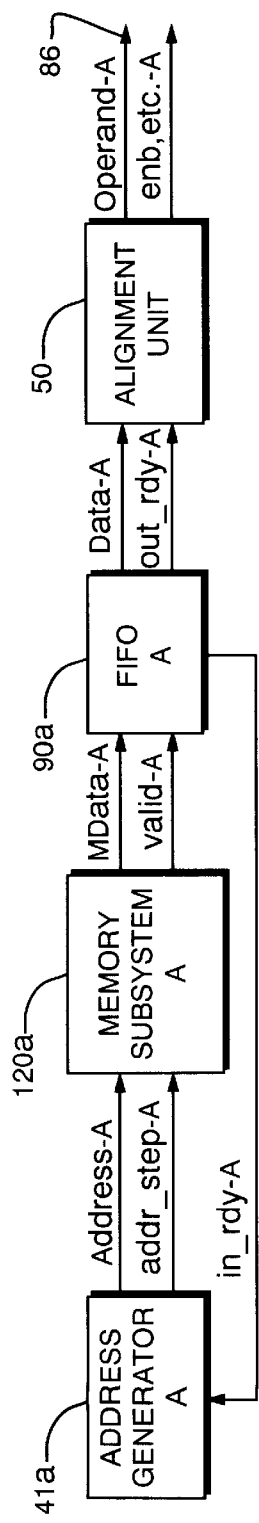
FIG. 8 is a schematic block diagram illustrating the addition of a FIFO to the data stream to solve a memory latency problem with a single operand in accordance with one feature of the present invention.

These types of memories, however, have a read data latency problem of several clock cycles. Accordingly FIFO-A 90 FIG. 8, which forms part of data path 121, FIG. 4, is designed to negate Address Generator A 41a's "in ready A" signal when enough space remains in the FIFO-A 90 to accommodate all additional words for which read commands are currently pending. While this signal is asserted, Address Generator A 41a is allowed to issue read commands (address step A) to Memory Subsystem A, 120a. As each valid processor/memory word 17 is delivered by Memory Subsystem A, 120a, it is pushed onto FIFO-A 90. The alignment unit 50 takes valid processor words from FIFO-A 90, aligns them, and delivers them to the Operand A bus 86.

Data flow from a DRAM may intermittently be slowed by the necessity to cross from one "page" of memory to another. Processor/memory words on the same memory "page" are accessed rapidly, but a page boundary crossing requires the memory to precharge, activate, and then transfer all the words on a page to an internal cache. In the present design, the two-bank architecture of typical SDRAM/SGRAM devices has been exploited, but some processor/memory word interruption is unavoidable (e.g. when a page boundary is crossed rapidly and repeatedly). Other interruptions occur during refresh cycles or memory accesses by other agents (e.g. DMA controller).

Figure 9:
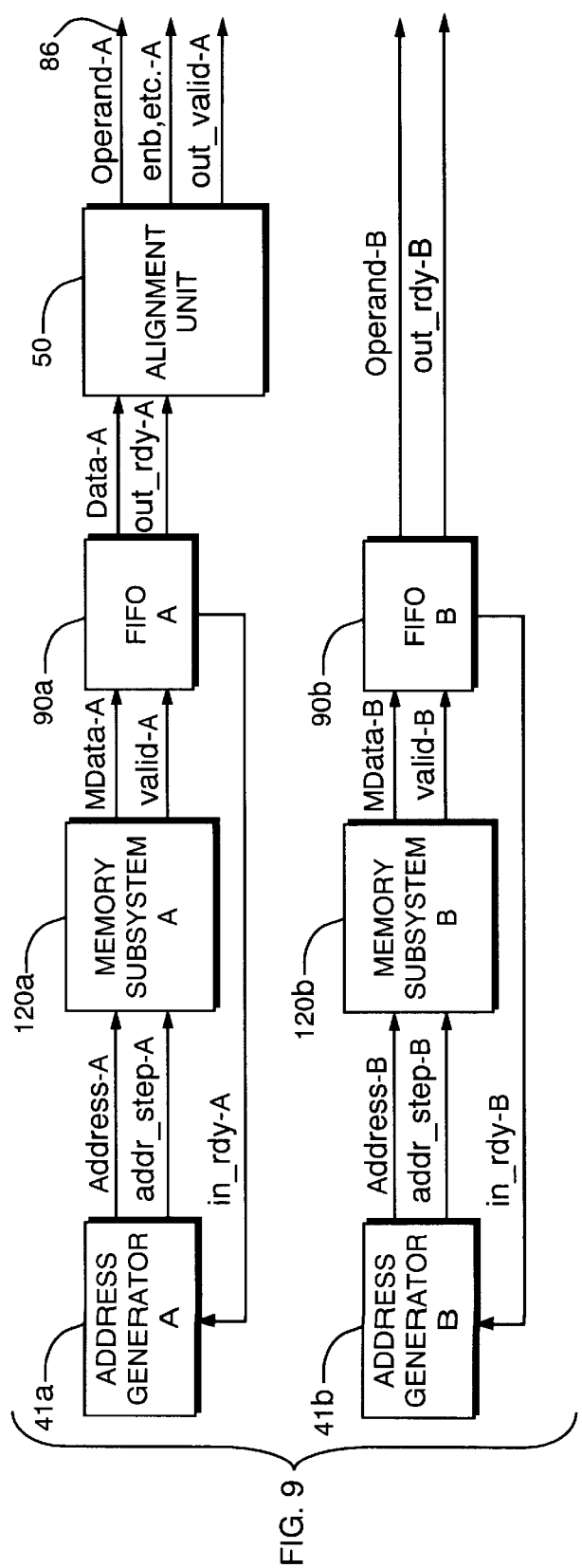
FIG. 9 is a schematic block diagram illustrating the addition of a FIFO to the data stream to solve a memory latency problem with two operands in accordance with one feature of the present invention.
Figure 10:
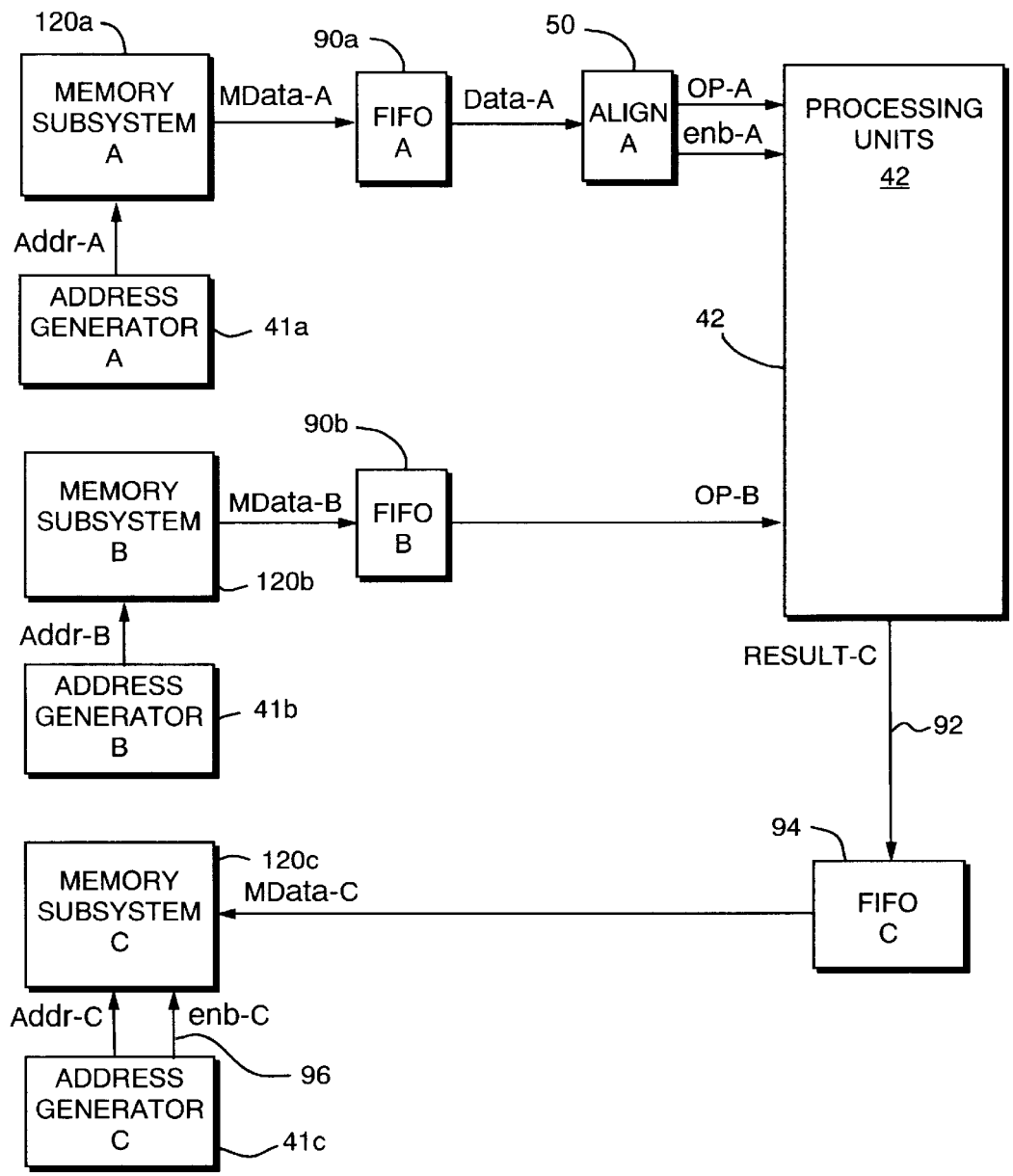
FIG. 10 is a schematic block diagram illustrating the addition of a FIFO to the data stream to solve a memory latency problem with three operands in accordance with one feature of the present invention.
Figure 11:
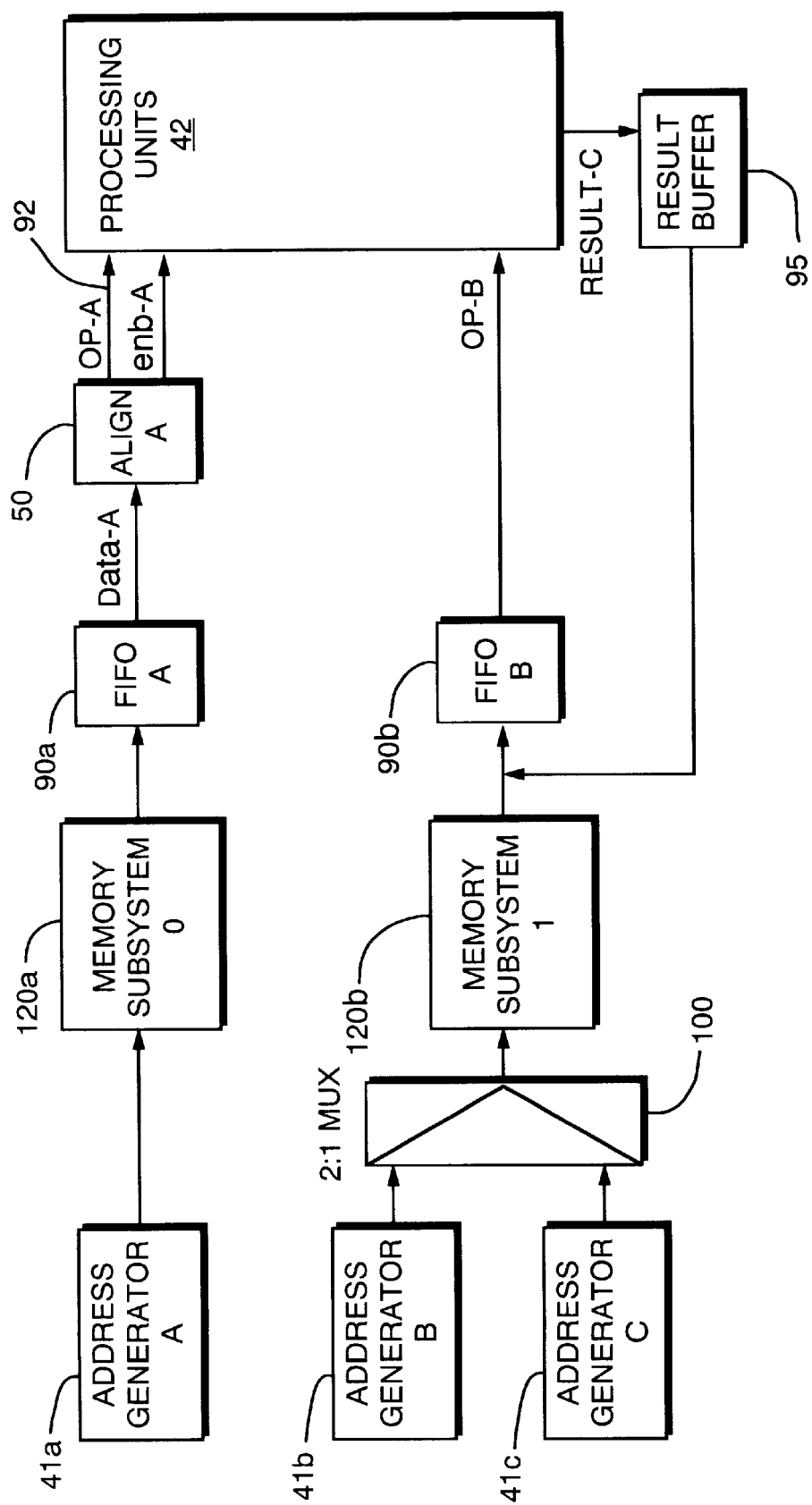
FIG. 11 is a schematic block diagram of one feature of the present invention illustrating the use of a result buffer to along with a shared memory to allow a three operand computation with two physical memories.

For a two or three operand computation, as shown in FIGS. 9–11, data must be valid on both input ports (A and B) and, if output is produced on the result-C bus 92, the data destination device must be capable of accepting it. By providing a result buffer or FIFO 94, FIG. 10 and 95, and FIG. 11, on each output or result port, a steady flow of data is maintained.

Address Generator 41c, FIG. 10, also generates byte write enable [3:0] signal 96 permitting only valid pixels/data samples to be written back to memory subsystem 120c. Thus, Address Generator C 41c participates in the alignment function described in FIG. 5 as part of the present invention. The start of each output row is aligned on a word boundary, but the width of the row may be any number of pixels/data samples. Thus, the last processor/memory word written in each row may not have all pixels (data samples) replaced. Address Generator C 41c thus exploits the fact that SDRAM/SGRAM devices have individual byte replacement capability.

FIFO C 94 performs a second important function. Some operations may produce more than one word of output data for each input data set (e.g. feature extraction). Secondly, some processing units 42 do not have the ability to stop the flow of data on each clock pulse. Thus, FIFO C 94 is also designed to negate its "in ready" signal when sufficient space remains in the FIFO to fully "drain" the active processing unit 42 of all data after the flow of input (Operand A, B) data is stopped.

In the present implementation, Memory Subsystem B 120b has no alignment unit since it is always word aligned. However, this is not a limitation of the present invention as those skilled in the art can readily add such an aligner to this memory subsystem also.

For greater economy, efficiency, and flexibility, it is necessary to share memories. FIG. 11 shows the addition of a Result Buffer 95 and address multiplexer 100 so that Memory Subsystem 1 120b can be shared. Three operand computations proceed at half speed because processing must stop and the result buffer 94 must be copied to Memory Subsystem 1 120b periodically.

For full flexibility, The two memories (0, 1) in memory subsystems 120a, 120b may contain either source or destination data for a given operation. This is important because after one operation, for example, the source for the next operation may now be in the opposite memory. The Data Buffer 102, FIG. 12, may be used either on the input of output side in an operation.

Figure 12:
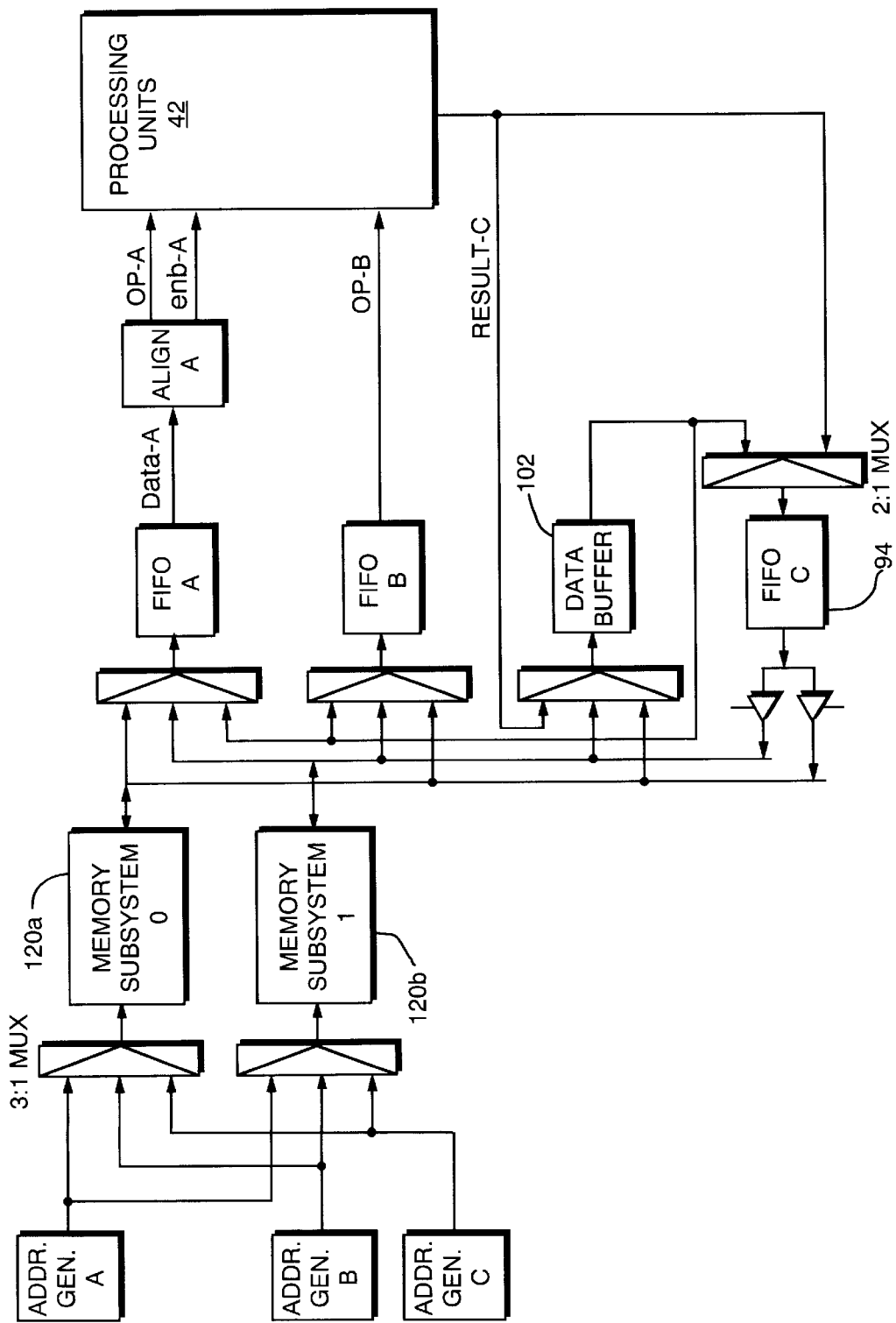
FIG. 12 is a schematic block diagram of one feature of the present invention illustrating the flexible data path arrangement in the present invention embodied in a vision processing accelerator.

In FIG. 12, both sources for a two or three operand function may be in one memory in memory subsystem 120a, 120b. When this is the case, the Data Buffer 102 is first filled with data for one operand and then data for the second operand can be fetched from the same memory. If output is required in this case, it must go to the other memory. Processing proceeds at half speed. Since output data goes directly to memory, the C FIFO 94 is important in smoothing out the data flow.

Similarly, when the operation produces an output which must go to the same memory as an input operand, the Data Buffer 102 captures the output data which is then dumped via the C FIFO 94 to the destination memory. To perform a three operand operation in this case, one of the input operands must be in the opposite memory.

The actual processing of data samples is performed by a number of word-wide processing units, 42, FIG. 1, each of which perform a specific processing task.

Figure 13:
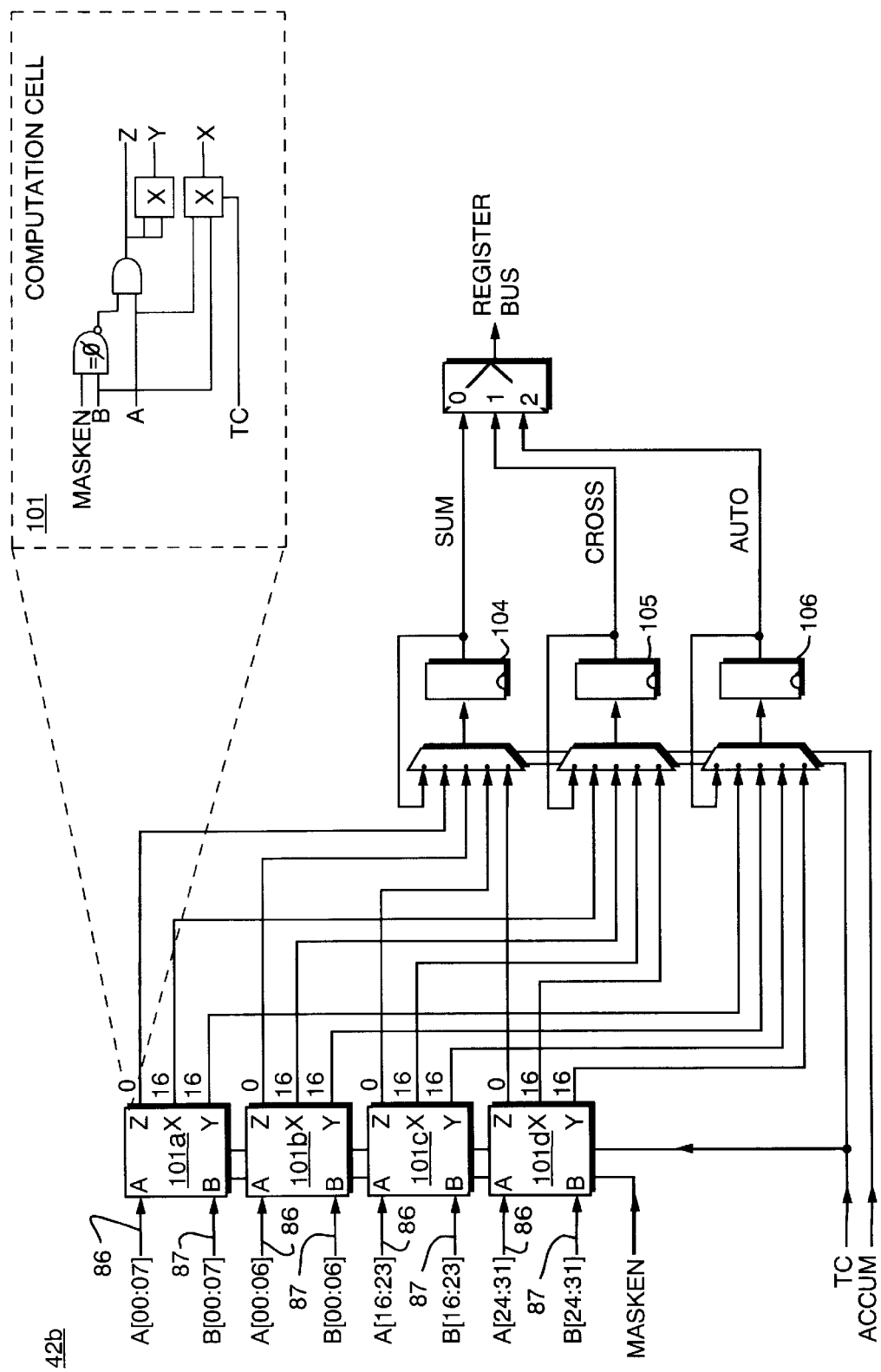
FIG. 13 is a schematic block diagram of a word-wide normalized correlation processing unit in accordance with one feature of the present invention.

FIG. 13 is a block diagram of the normalized correlation processing unit 42b. This processing unit accepts a processor word 17 of image data samples 15 from the alignment unit 50 via the Operand A bus 86, and a word of template data from the Operand B bus 87 every processor/memory clock cycle. During each clock cycle, all of the corresponding pixels (data samples) in the two words are multiplied together in four (4) computational cells 101*a–c*, and the internal summation registers 104–106 containing sum-of-image 104, sum-of-image-squared 106, and sum-of-image-times-template 105 are all updated.

FIGS. 14A–14K and FIG. 15 show how the word-wide neighborhood formation unit 42*a* simultaneously forms four complete 3×3 neighborhoods surrounding each pixel in the word being processed. These complete neighborhoods are passed in parallel to separate processing units, and the results from the processing units are re-assembled after processing to form outgoing words. The neighborhood processing logic keeps track of the boundary conditions, and feeds background data to the processing units in place of all of the missing pixels for neighborhoods that are on the edges of the region of interest.

First row processing: During the first clock cycle, pixels 00/01/02/03 arrive and are stored in the "right", FIG. 14B. During the second clock cycle, pixels 04/05/06/07 arrive and are stored in the right, and 00/01/02/03 transfer to the "center", FIG. 14C. During the third clock cycle, pixels 08/09/010/011 arrive; pixels 04/05/06/07 transfers to the "center"; and pixels 00/01/02/03 transfer to the "left", FIG. 14D. No outputs are computed while the first row is being transferred, but these words are fed into the first word-wide row fifo.

Second row processing: During the first clock cycle, pixels 10/11/12/13 arrive along with 00/01/02/03 coming from the first row fifo, both these words are are stored in the "right", FIG. 14E. During the second clock cycle, pixels 14/15/16/17 arrive along with pixels 04/05/06/07 from the first row fifo. These new words are stored in the "right", while the processor words currently in the "right" move to the "center", FIG. 14F. This forms the first full neighborhood that will be processed in the neighborhood array. The processing unit automatically fills in the border value for values of "xx". During the third clock cycle, pixels 18/19/110/111 arrive along with 08/09/010/011 from the first row fifo. These new words are stored in the "right", while the words currently in the "right" move to the "center", FIG. 14G.

Third row processing: During the first clock cycle, pixels 20/21/22/23 arrive along with pixels 10/11/12/13 from the first row fifo and pixels 00/01/02/03 arrive from the second row fifo, FIG. 14H. Note that during this clock cycle, the processing unit 42*a* is processing the right-most neighborhood group of the previous row. During the second clock cycle, pixels 24/25/26/27 arrive along with pixels 14/15/16/17 from the first row fifo and pixels 04/05/06/07 from the second row fifo, FIG. 14J. During the third clock cycle, pixels 28/29/210/211 arrive along with pixels 18/19/110/111 from the first row fifo and pixels 08/09/010/011 from the second row fifo, FIG. 14K.

This forms the first full-valid group of four (4) 3 pixel×3 pixel neighborhoods. The four 3×3 neighborhoods processed during this clock cycle are shown in FIG. 14K. Processing continues until the last row, which which is computed using values that are draining out of the row fifos. There is no incoming data while the last output row is being processed.

Figure 15A:
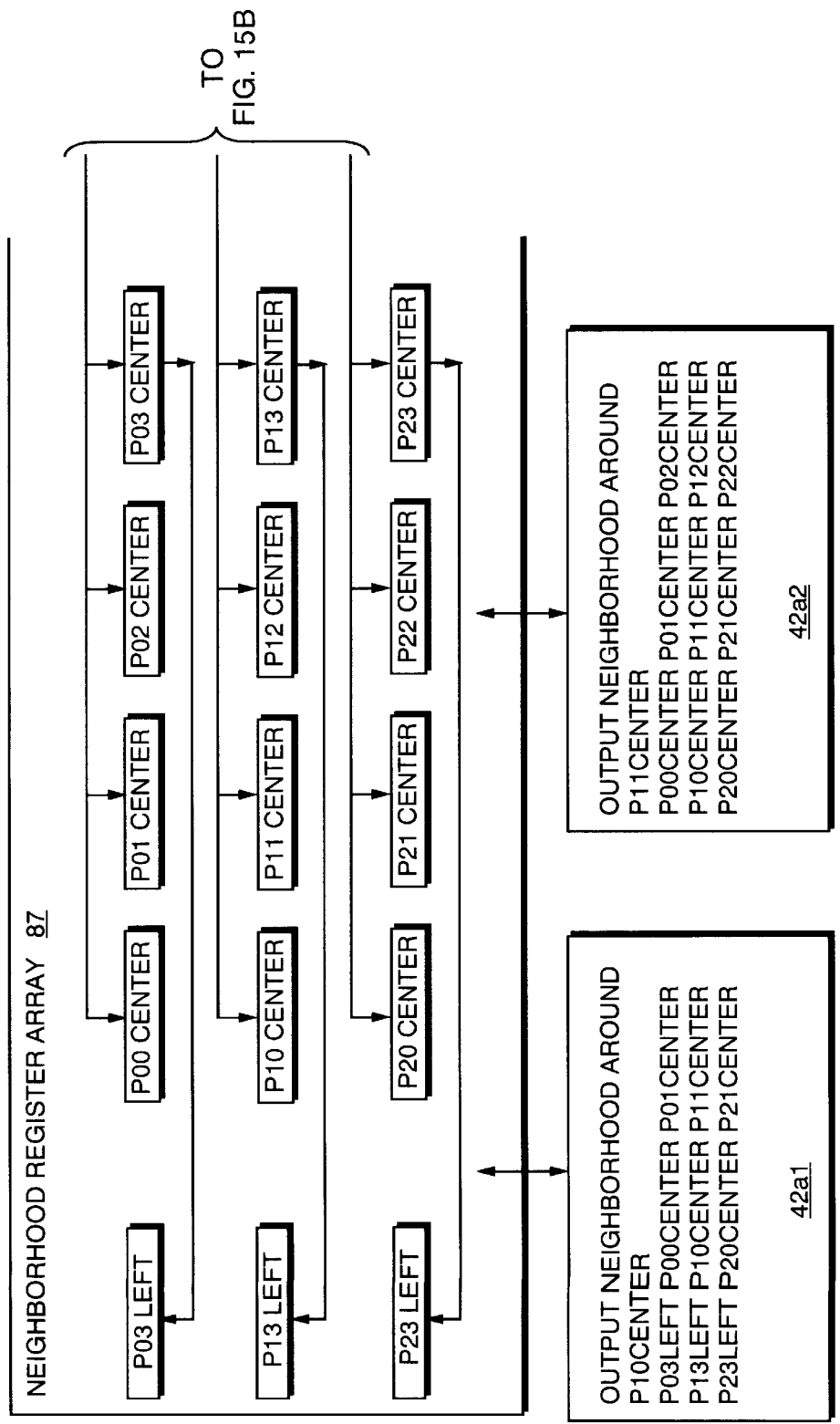
FIG. 15 is a schematic block diagram of the preferred implementation of the word-wide neighborhood formation image processing unit according to one aspect of the present invention.
Figure 15B:
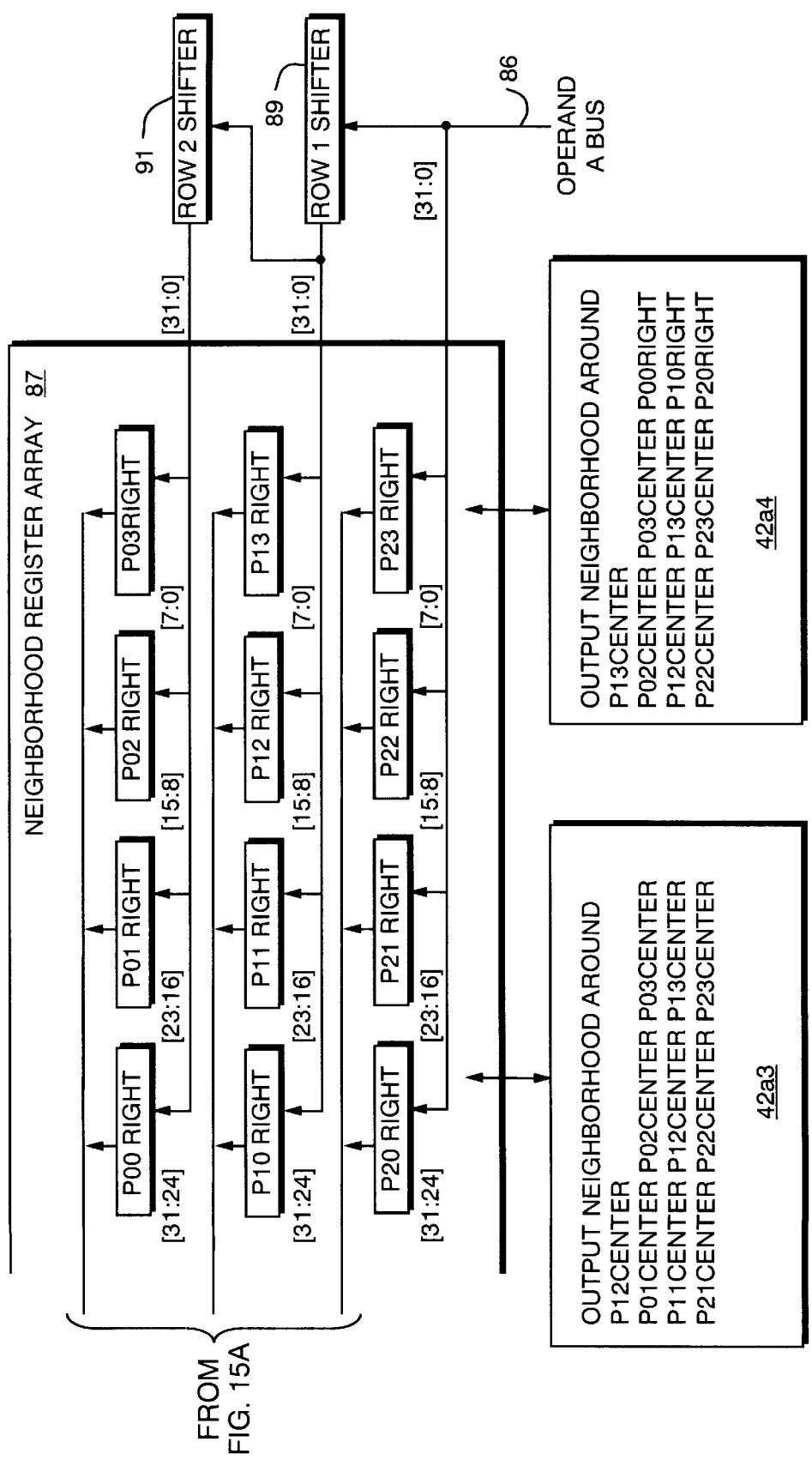

FIG. 15 shows the preferred, although not the only possible implementation of the word-wide neighborhood formation unit 42*a*. The data enters from the Operand A bus 86, which, for purposes of the present example, carries four pixels (data samples) in a single processor/memory word. This data goes into the neighborhood register array 87 and also into the row 1 shifter 89. When the processor word 17 enters the neighborhood register array 87, the processor word 17 is stored in the four pixel registers labeled p20right, p21right, p22right, and p23right. Each time a valid processor word arrives, the data "steps" forward with all of the pixels (data samples) in the "right" registers moving to the corresponding position in the "center" registers, and then finally to the "left" registers. Only the right hand most pixel on the "left" side is needed to complete the neighborhood. All the pixels on the "right", however, are needed to copy and fill in the "center". After the first row of processor words 17 has arrived, the Row 1 shifter 89 starts to provide data into the second row registers labeled p10right, p11right, p12right and p13right, and after another full row of data arrives, the Row 2 shifter 91 provides data into the Row 3 registers beginning with the registers labeled p03right, p02right, p01right, and p00right. When valid data enters the central word labeled p10center, p11center, p12center and p13center, word-wide neighborhood processing commences with the four parallel neighborhood processing units $42a_1$ through $42a_4$ receiving sets of neighborhood values simultaneously. The neighborhood values are extracted from the neighborhood register array 87 as shown in the bottom of FIG. 15.

Figure 16:
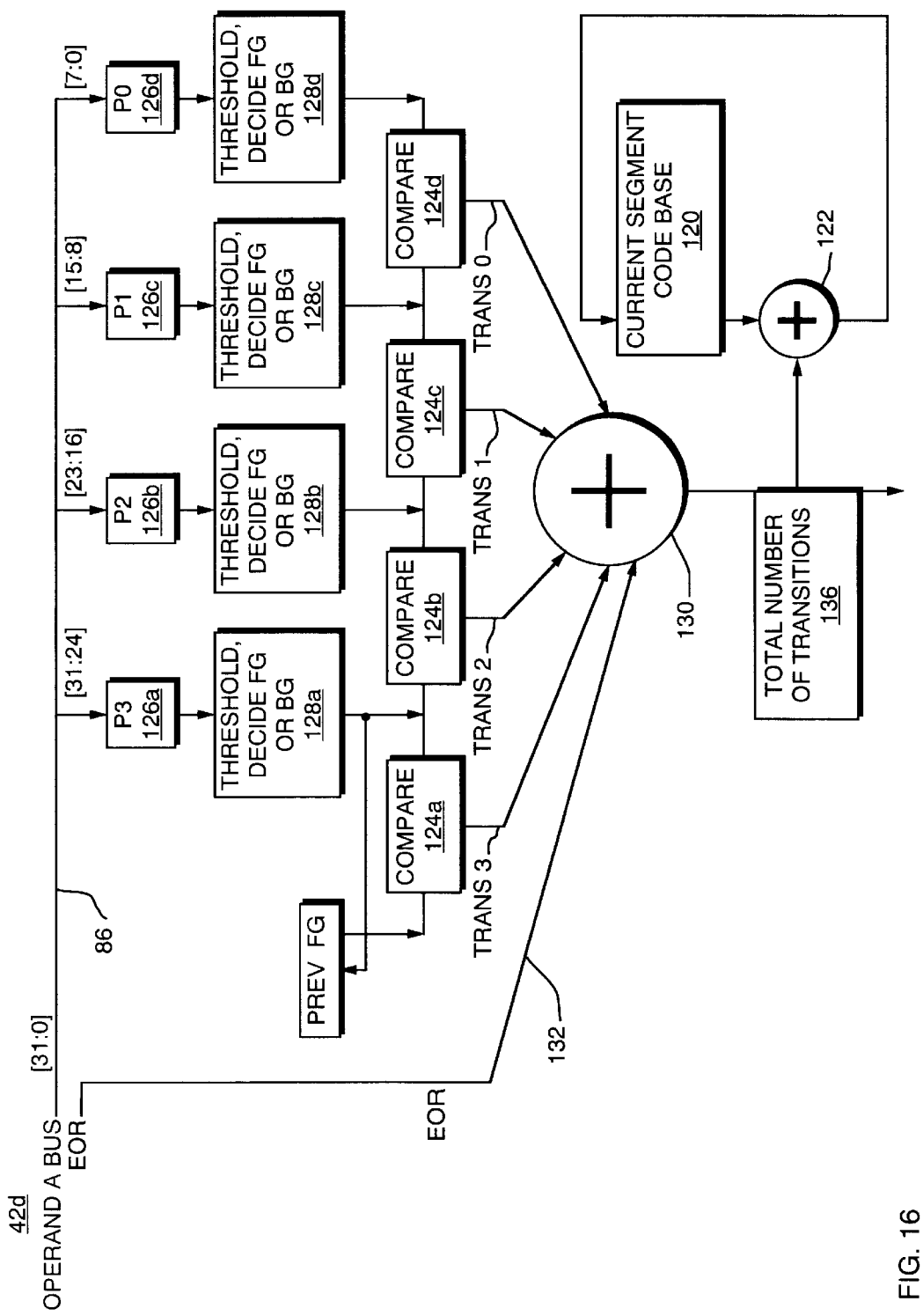
FIG. 16 is a schematic block diagram of a word-wide segmentation processing unit in accordance with another feature of the present invention.

FIG. 16 shows the first stage of a word-wide segmentation processing unit 42*d* useful in a machine vision system. The word-wide segmentation processing unit 42d only generates results when transitions are detected in the stream 17 of pixel image data. Each pixel is determined to belong in either the foreground or the background according to a threshold criteria. A transition is defined as any point in the data stream where a foreground pixel is adjacent to a background pixel.

At the beginning of the processing of a "row" of image data, the segment code 120 is initialized to zero. Each time a transition is detected, the segment code is incremented using adder 122, and a result word is generated containing information about the transition. To implement this functionality while processing four pixels at a time in one processor word 17, four threshold comparators 124*a*–124*d* simultaneously determine whether each of the four incoming pixels 126*a*–126*d* is in the foreground or the background. Four one-bit comparators 128*a*–128*d* simultaneously determine whether there is a transition between each of the four adjacent pixels in the processing word, or between the left-most pixel of the current word and the right-most pixel of the previous word.

Up to four transitions may occur simultaneously, although with real image data it is much more likely that there will be no transitions at all or a single transition. The total number of transitions to be processed during this clock cycle is computed by adder 130, which also incorporates the possibility that the current word is the last word of the row (eor signal 130).

The word-wide segmentation processing unit 42*d* always generates a special transition record for the end of the row (eor 130), so the maximum number of transition records that must be generated could be as high as five at the end of a row. The transition record is encoded into a single 32-bit word 134, and therefore this processing unit 42*d* can actually generate up to five processor words 17 of result for a single word of input. The interface between this processing unit 42*d* and the operation sequencer 210 (FIG. 18) shown in FIG. 16 only permits the word-wide segmentation processing unit 42*d* to generate one word of result per clock pulse, so when it is necessary to generate more than one result word, the incoming data must be stalled while the results are generated. This is implemented by using the total number of transitions 136 to control a signal that immediately shuts off the incoming data when the total number of transitions is greater than one.

As the segment record results are generated, the number of transitions is counted down, and the incoming data 86 is permitted to resume as the last result is generated. This architecture permits the processing accelerator 20 to run at full speed as long as there is one transition per word or less.

Figure 17:
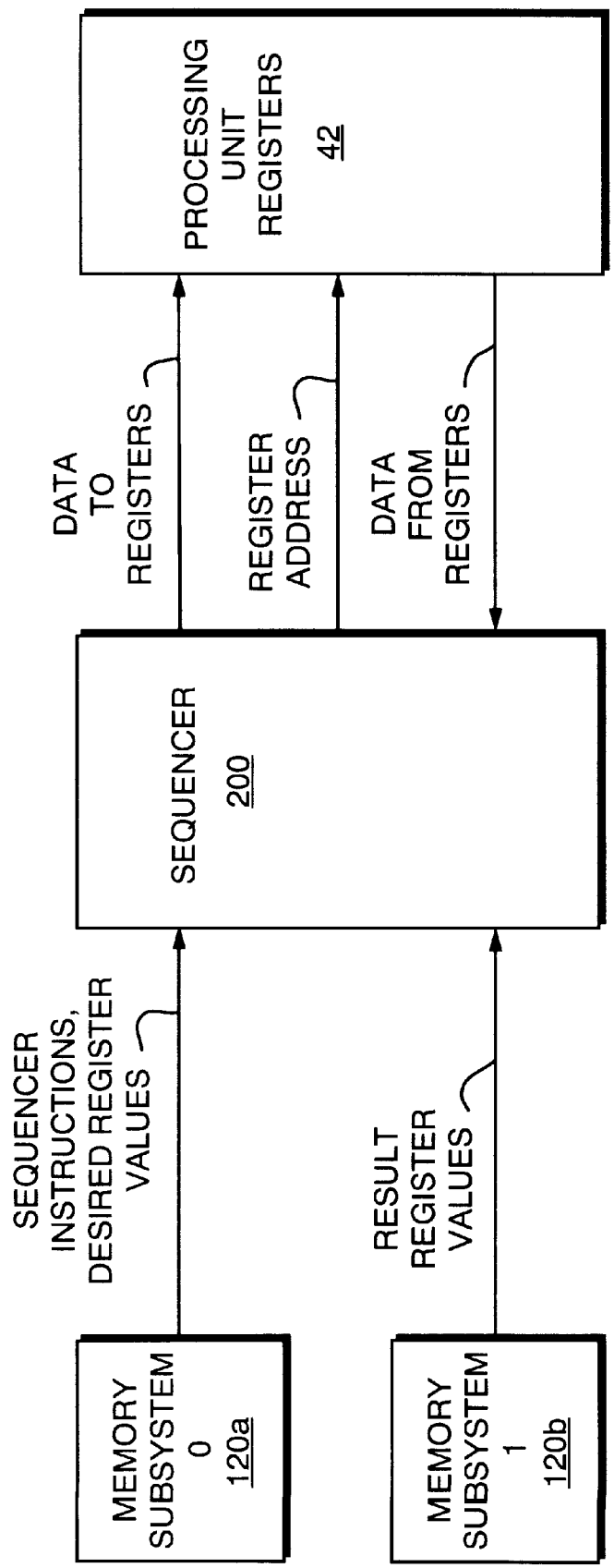
FIGS. 17 and 18 are schematic block diagrams illustrating the operation of an internal processing accelerator sequencing engine in accordance with another aspect of the present invention.

FIG. 17 illustrates how the sequencer 200 of the present invention reads simple instructions from one memory bank and writes results to the other memory bank. Only four instructions are supported: WRITE, READ, GO, and STOP. The op-code for the instruction is encoded in two bits, and the remaining bits contain the register address for the register specified by the READ or WRITE instruction. The remaining bits are unused for the GO and STOP instructions. The WRITE instruction writes the next word found in the instruction stream to the register specified by the register address portion of the WRITE instruction. The READ instruction reads the value from the register specified by the register address portion of the READ instruction and outputs the value of this register to the outgoing data stream. The "program" used by the sequencer engine 200 is a sequential block of instruction words and WRITE operands; and the "output" is a sequential block of register values. The sequencer engine 200 allows the processing accelerator to operate without CPU attention for significant periods of time.

The sequencer engine 200 runs entirely from the dedicated memories 18a, 18b, permitting the processing accelerator 20 to perform arbitrary operations without requiring CPU 16 attention.

Figure 18:
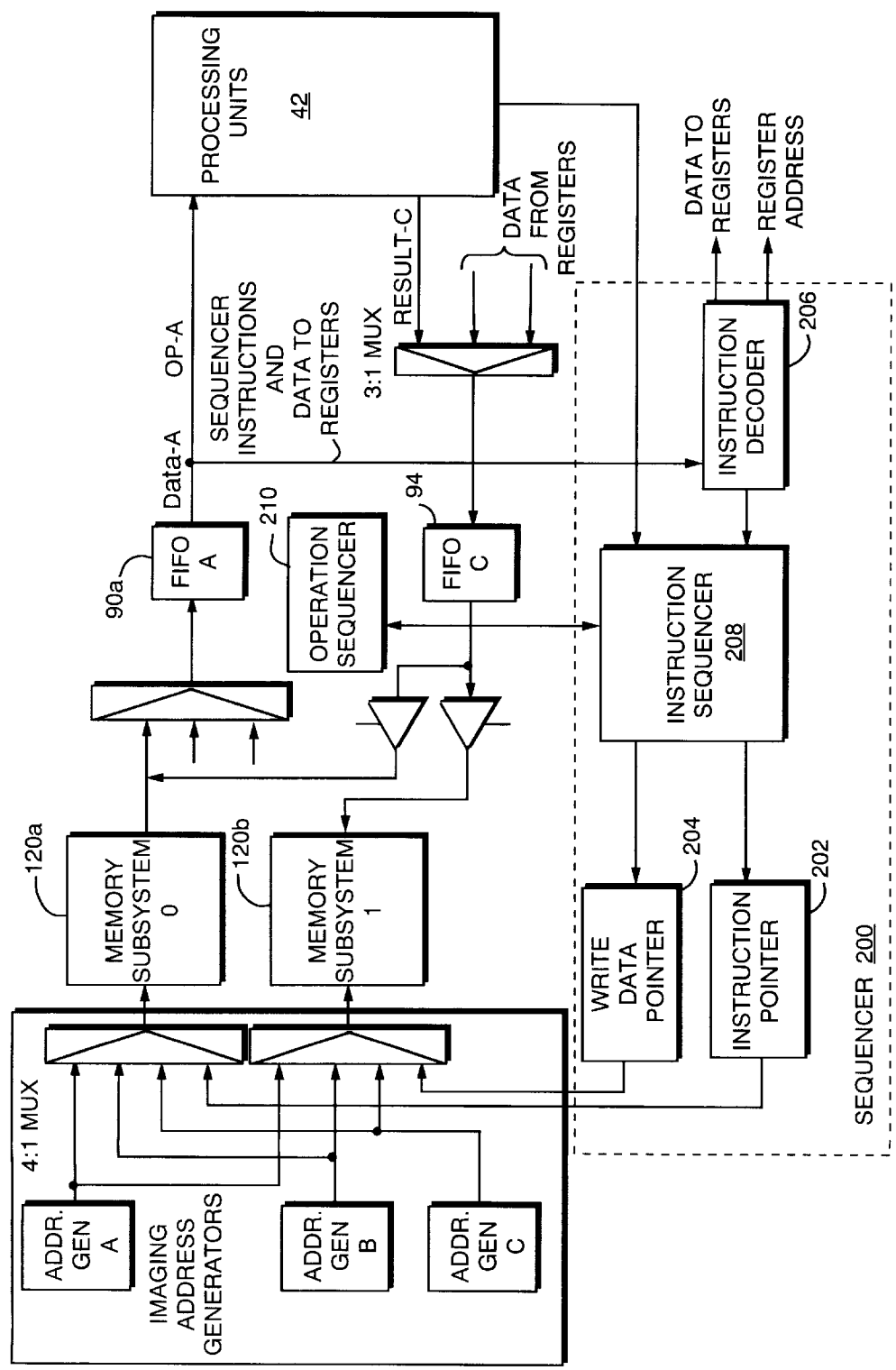

The sequencer engine 200, FIG. 18, controls the address and data selectors such that the address of memory subsystem 0 120a is supplied by the instruction pointer 202 and the address of memory subsystem 1 120b by the write data pointer 204. Similarly, data from memory subsystem 0 120a goes to FIFO A 90a and data from FIFO C 94 goes to memory subsystem 1 120b. The sequencer 200 generates register addresses and reads and writes register data.

Memory words are fetched from sequential addresses supplied by the instruction pointer 202. These words contain a stream of instructions as described (above). Instructions are fetched into FIFO A 90a and interpreted by the instruction decoder 206 under control of the instruction sequencer 208. On a WRITE instruction, data from a selected register is written via FIFO C 94 to memory 1 120b addressed by the write data pointer 204.

On a GO instruction, the instruction sequencer 208 waits until any data remaining in FIFO C 94 has been written to memory 1 120b, then FIFO A 90a is cleared, flushing any pre-fetched instructions. Finally, the processing accelerator operation sequencer 210 is started. During the operation, the operation sequencer 210 controls data flow between the memories 120 and processing units 42 via FIFOs A, B, and C 90a, 90b, and 94. The instruction sequencer 208 waits for the operation sequence to complete, saving the address of the next instruction in an internal program counter. When the operation completes and any result data remaining in FIFO C 94 has been written, the instruction pointer 202 is re-initialized to the saved next instruction address, FIFO A 90a is cleared, and sequencer instructions are re-fetched into FIFO A 90a. When valid data (the next instruction) is present in FIFO A 90a, sequencer 200 operation resumes.

A similar action also takes place when the sequencer 200 is started under CPU control. In this instance, the program counter and instruction pointer 202 are both initialized to the address of the first instruction in memory 0 120a, all FIFOs are cleared, and the sequencer waits for the first instruction to appear in FIFO A.

On a STOP instruction, the instruction sequencer 208 waits until any data remaining in FIFO C 94 has been written to memory 1 120b before operations are halted.

For maximum efficiency of a system implementing the present invention, it is often necessary for separate copies of data samples (e.g. an image) to be present in the dedicated processing accelerator 20 memory as well as in vision CPU, host, or display controller memory. One example is simultaneously displaying a captured image while making the image available to the processing accelerator. Another example is making the image available to the vision system CPU as well as to the processing accelerator so that two different vision operations can run concurrently. In a third related example, the vision system CPU renders graphics on a captured image while the processing accelerator processes it. To make multiple copies of an image doubles the bandwidth requirement on the peripheral bus and increases latency. The current invention solves this problem by a snooping technique.

Figure 19:
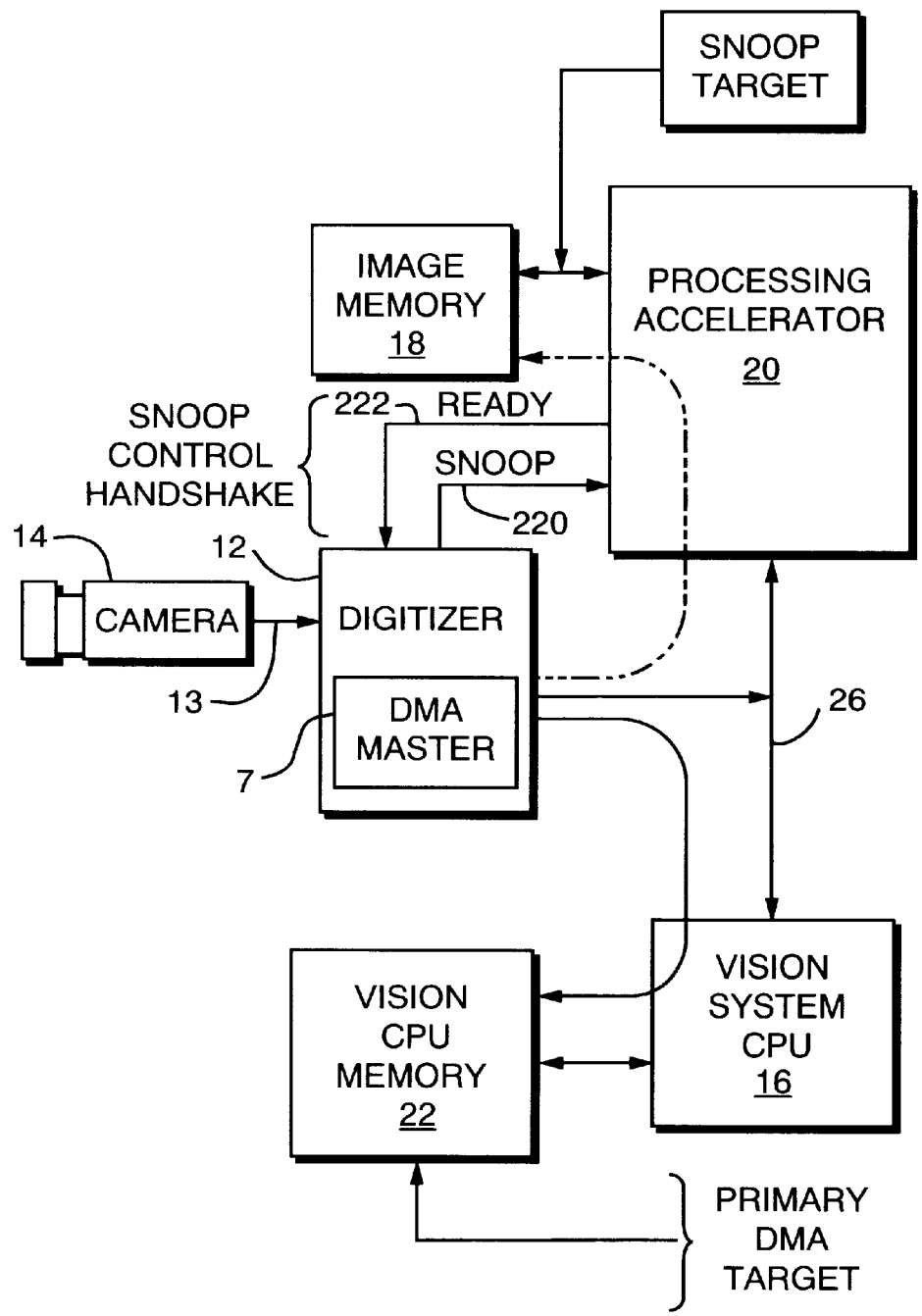
FIGS. 19 and 20 are schematic block diagrams illustrating the use of the snoop feature and the peripheral bus interface according to yet another feature of the present invention implemented in a machine vision system.

A simplified version of the snooping feature of the present invention is shown in FIG. 19 (with only the shared CPU memory 22 shown). The digitizer/DMA 12 is set up to write image data 13 to a primary target address, which, in the current example may be in shared vision CPU memory 22, host CPU memory (not shown), or display memory(not shown). Snoop handshake signals 220, 222 between the digitizer 12 and the vision accelerator 20 control the digitizer/DMA 12 activity. When the processing accelerator 20 can accept a known amount of data 13, it asserts the READY signal 222. The digitizer 12 then commences a DMA operation, sending a limited number of words over the peripheral bus 26 to the primary target, the CPU memory 22. When the digitizer 12 becomes peripheral bus master, it asserts the SNOOP signal 220. The processing accelerator 20 captures each processor word 17 as it traverses the peripheral bus 26 using this signal and additional peripheral bus data transfer control signals. The vision accelerator 20 places the snooped data 17 in image memory 18 using an internal DMA input address generator 234 in FIG. 20, ignoring the peripheral bus target address signals. The READY signal 222 is negated as soon as data capture commences and remains negated until data has been stored in image memory 18.

Figure 20:
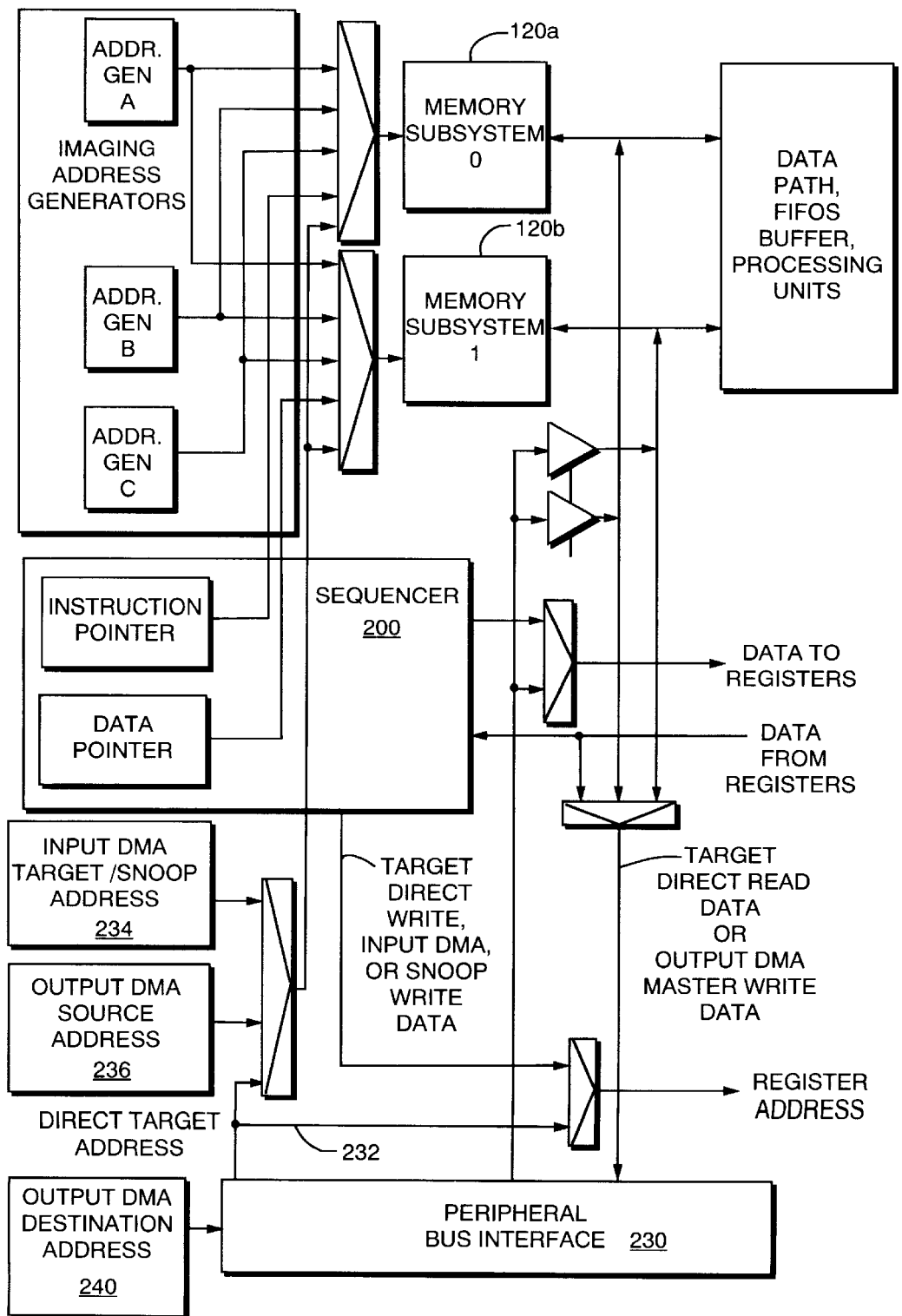

The circuit pictured in FIG. 20 adds address and data paths for exchanging peripheral bus data with registers and memories in the processing accelerator. The peripheral bus interface 230 uses standard technology and contains additional FIFOs for buffering transmissions between the CPU 16 or digitizer 12 and the processing accelerator. Because the peripheral bus interface 230 operates in burst mode, it can transfer data efficiently to sequential memory locations. As a peripheral bus target (slave) the peripheral bus interface supplies an address and exchanges data with the processing accelerator 20. The supplied direct target address 232 may be used to directly address image memory 18 and register locations, or, on peripheral bus to memory write cycles, the destination address may alternatively be supplied by the DMA input address generator 234. In snoop mode (described above), data targeted to another peripheral bus device is captured in a special snoop FIFO and written to image memory 18, also under control of the input DMA address generator 234.

The peripheral bus interface 230 also contains a peripheral bus master circuit. This circuit reads data from memory 18 addressed by the output DMA source address generator 236 into the peripheral bus interface master data FIFO within the peripheral bus interface 230. Peripheral bus destination addresses (in CPU, Host, or display memory) are supplied by the output DMA destination address generator 240.

Modifications and substitutions by one of ordinary skill in the art are considered to be within the scope of the present invention which is not to be limited except by the claims which follow.

What is claimed is:

1. A data processing system, comprising:

a data organizer, for receiving a sequential stream of data comprising a plurality of logically adjacent data samples, and for organizing a digital representation of a predetermined number of said plurality of logically adjacent data samples into a processor word;

at least one data sample memory, responsive to said data organizer, for storing a plurality of said processor words;

a data word aligner, responsive to said at least one data sample memory, for receiving at least first and second said processor words, for selecting at least one data sample from said first processor word and at least one data sample from said second processor word, and for providing at least one aligned processor word comprising said predetermined number of said plurality of logically adjacent data samples, said aligned processor word including at least said selected at least one data sample from said first processor word and said selected at least one data sample from said second processor word; and at least one word-wide data processor, responsive to said data word aligner, for receiving a sequential stream of said aligned processor words, each said aligned processor word comprising said predetermined number of said logically adjacent data samples, for simultaneously processing said predetermined number of logically adjacent data samples received as said sequential stream of aligned processor words, and for generating a sequential stream of data processor result words based on said simultaneously processed predetermined number of logically adjacent data samples received as said one aligned processor word from said sequential stream of aligned processor words, said at least one word-wide data processor selected from the group consisting of: a neighborhood processing unit; an image arithmetic processing unit; a segmentation processing unit; a morphology processing unit; and a correlation processing unit.

2. The processing system of claim 1 wherein said logically adjacent data samples include image data, each of said plurality of logically adjacent image data samples representing one pixel of image data from an image to be processed, wherein logically adjacent sequential image data samples represent adjacent pixels of image data from said image to be processed, and wherein said data sample memory stores at least two adjacent pixels of image data together as one said processor word.

3. The processing system of claim 2 wherein said data sample memory transfers and said word-wide data processor receives at least one processor word each processor cycle.

4. The processing system of claim 1 further including a memory address generator, coupled to said at least one data memory, for addressing said memory to provide said at least first and second processor words.

5. The processing system of claim 2 wherein said neighborhood processing unit includes a neighborhood image processing unit, for forming at least two neighborhoods of predetermined size around at least two pixels of image data.

6. The processing system of claim 2 wherein said neighborhood processing unit includes a neighborhood image processing unit, for forming at least two neighborhoods of predetermined size around each of said at least two adjacent pixels of image data stored together as said processor word.

7. The processing system of claim 1 wherein said word-wide data processor is coupled to a data bus, said data bus for transporting processor words from said data organizer to a primary data sample target device; and wherein said word-wide data processor further includes a data capture device, for controlling the simultaneous capture of processor words being transmitted over said data bus to said primary data sample target, and for storing a copy of said processor words in said at least one data sample memory.

8. The processing system of claim 1 wherein said at least one data sample memory includes first and second data sample memories; and further including at least one processing sequencer, for reading instructions and processor register values from said at least one data sample memory, and for writing at least processor register values to at least said at least one data sample memory.

9. The processing system of claim 1 further including at least one data sample memory controller, for executing data sample memory control instructions while said at least one data sample memory is providing sequential data sample values as processor words.

10. The processing system of claim 1, wherein said word-wide sample data processor further includes at least one word-wide sample data processing unit.

11. The processing system of claim 10, wherein said at least one word-wide sample data processing unit is selected from the group consisting of: a neighborhood processing unit; an arithmetic processing unit; a segmentation processing unit; a morphology processing unit; and a correlation processing unit.

12. The processing unit of clam 1 further comprising a word-wide neighborhood processing image processing unit, for simultaneously forming and processing at least two neighborhoods of predetermined size around at least two pixels of image data.

13. The processing system of claim 2, wherein said at least one data sample memory includes at least one burst-mode data sample memory including a two-dimensional array of sample registers connected so complete processor words flow through said array and complete neighborhoods of image data sample values surrounding each pixel of image data may be simultaneously extracted from said array for simultaneous processing.

14. The processing system of claim 1, wherein said data organizer is coupled to a data bus, said data bus for transporting data from said data organizer to a primary data sample target device; and wherein said data processor further includes a data capture device for controlling the simultaneous capture of data samples being transmitted over said data bus to said primary sample data target, and for storing a copy of said data samples in said at least one burst-mode data sample memory.

15. The processing system of claim 1 further including at least one processing sequencer for reading instructions from said at least one data sample memory and for writing at least processor register values to at least one data sample memory.

16. The processing system of claim 1 further including at least one data sample memory controller, for executing data sample memory control instructions while said at least one data sample memory is providing sequential data sample values as processor words.

* * * * *